US012612317B2

(12) United States Patent
Sasaki et al.

(10) Patent No.: US 12,612,317 B2
(45) Date of Patent: Apr. 28, 2026

(54) METHOD AND APPARATUS FOR TREATING WATER

(71) Applicant: ORGANO CORPORATION, Tokyo (JP)

(72) Inventors: Keisuke Sasaki, Tokyo (JP); Kazushige Takahashi, Tokyo (JP); Yusuke Takahashi, Tokyo (JP); Fumio Sudo, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 336 days.

(21) Appl. No.: 18/280,583

(22) PCT Filed: Jan. 7, 2022

(86) PCT No.: PCT/JP2022/000341
§ 371 (c)(1),
(2) Date: Sep. 6, 2023

(87) PCT Pub. No.: WO2022/190608
PCT Pub. Date: Sep. 15, 2022

(65) Prior Publication Data
US 2024/0150200 A1 May 9, 2024

(30) Foreign Application Priority Data

Mar. 10, 2021 (JP) ................................. 2021-038309

(51) Int. Cl.
*C02F 1/20* (2023.01)
*C02F 1/32* (2023.01)
(Continued)

(52) U.S. Cl.
CPC .................. *C02F 1/32* (2013.01); *C02F 1/20* (2013.01); *C02F 1/461* (2013.01); *C02F 1/68* (2013.01);
(Continued)

(58) Field of Classification Search
CPC .... C02F 1/32; C02F 1/20; C02F 1/461; C02F 1/68; C02F 2101/30; C02F 2209/22;
(Continued)

(56) References Cited

U.S. PATENT DOCUMENTS

| | | | |
|---|---|---|---|
| 6,808,608 | B2 | 10/2004 | Srinivasan et al. |
| 7,704,749 | B2 | 4/2010 | Srinivasan et al. |

(Continued)

FOREIGN PATENT DOCUMENTS

| | | |
|---|---|---|
| CN | 105517957 A | 4/2016 |
| CN | 109890766 A | 6/2019 |

(Continued)

OTHER PUBLICATIONS

Full English translation of JP_2014200782_A, Oct. 27, 2014 (Year: 2014).*

(Continued)

*Primary Examiner* — Joseph W Drodge
(74) *Attorney, Agent, or Firm* — Greenblum & Bernstein, P.L.C.

(57) ABSTRACT

A water treatment apparatus for decomposing and removing organic substances in water to be treated includes: a hydrogen peroxide source for storing hydrogen peroxide which is added to the water to be treated; an ultraviolet oxidation device for irradiating ultraviolet light to the water to be treated to which hydrogen peroxide has been added; and a hydrogen peroxide removal device for removing hydrogen peroxide contained in the outlet water from the ultraviolet oxidation device. The hydrogen peroxide removal device includes: an anode and a cathode; and a hydrogen peroxide removal chamber disposed between the anode and the cathode and provided with a metal catalyst with ability of decomposing hydrogen peroxide. A DC current is applied between the anode and cathode.

15 Claims, 10 Drawing Sheets

(51) Int. Cl.

| | |
|---|---|
| *C02F 1/461* | (2023.01) |
| *C02F 1/68* | (2023.01) |
| *C02F 101/30* | (2006.01) |

(52) U.S. Cl.
CPC ...... *C02F 2101/30* (2013.01); *C02F 2209/22* (2013.01); *C02F 2305/02* (2013.01)

(58) Field of Classification Search
CPC .... C02F 2305/02; C02F 1/4676; C02F 1/722; C02F 9/00; C02F 1/4695; C02F 2303/18; C02F 1/44; C02F 1/469; C02F 1/72; B01D 61/44; B01D 61/48; B01J 23/56; B01J 47/06; B01J 47/08
See application file for complete search history.

(56) References Cited

U.S. PATENT DOCUMENTS

| | | | | |
|---|---|---|---|---|
| 2002/0063088 | A1* | 5/2002 | Hidaka ...................... | C02F 1/42 210/263 |
| 2003/0132104 | A1* | 7/2003 | Yamashita ................ | C02F 9/00 204/252 |
| 2006/0201882 | A1* | 9/2006 | Chen .................... | B01D 61/025 210/759 |
| 2011/0284377 | A1* | 11/2011 | Rohde ................... | B01J 23/745 204/542 |
| 2015/0157976 | A1 | 6/2015 | Srinivasan et al. | |
| 2021/0181167 | A1* | 6/2021 | Sundstrom .............. | C02F 1/008 |
| 2023/0249992 | A1* | 8/2023 | Sasaki ...................... | C01B 5/00 204/632 |

FOREIGN PATENT DOCUMENTS

| | | | |
|---|---|---|---|
| CN | 109906206 | A | 6/2019 |
| JP | 10-272474 | | 10/1998 |
| JP | 2004-66219 | A | 3/2004 |
| JP | 2007-185587 | A | 7/2007 |
| JP | 2011-120967 | A | 6/2011 |
| JP | 2011-218248 | A | 11/2011 |
| JP | 2012-61443 | A | 3/2012 |
| JP | 2014-200782 | A | 10/2014 |
| JP | 2018-79448 | A | 5/2018 |
| KR | 10-2019-0066059 | | 6/2019 |
| TW | 201509821 | A | 3/2015 |
| WO | 2018/092832 | | 5/2018 |

OTHER PUBLICATIONS

Office Action, dated Jul. 9, 2025 in Chinese family member application No. 202280019151.4, with English language translation thereof.

International Search Report issued Mar. 15, 2022 in International Bureau of Wipo Patent Application No. PCT/JP2022/000341 with an English translation thereof.

Written Opinion issued Mar. 15, 2022 in International Bureau of Wipo Patent Application No. PCT/JP2022/000341 with an English translation thereof.

Office Action with search report dated Feb. 7, 2025, Taiwanese family member patent application No. 111101599, with English language translation thereof.

* cited by examiner

[FIG. 1A]
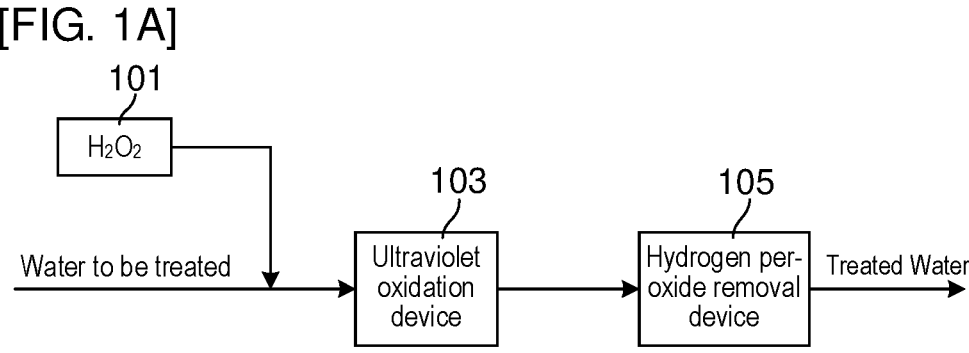
[FIG. 1B]
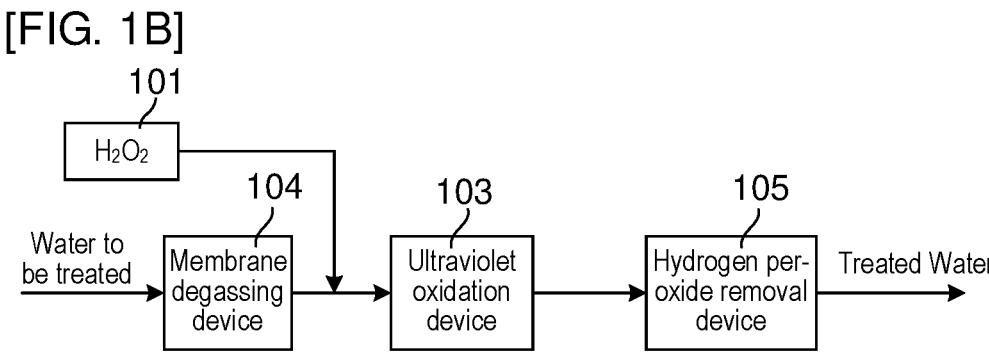
[FIG. 1C]
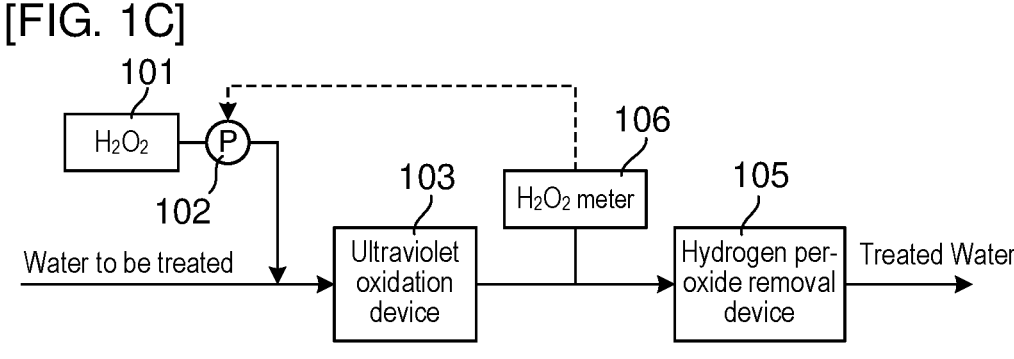
[FIG. 1D]
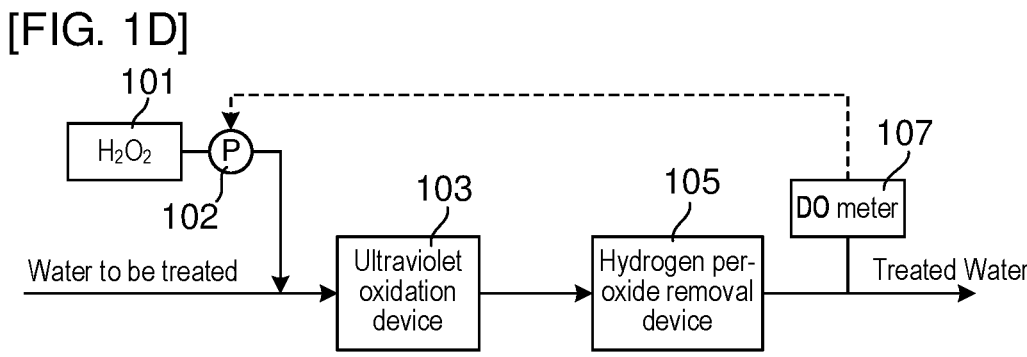

[FIG. 2]
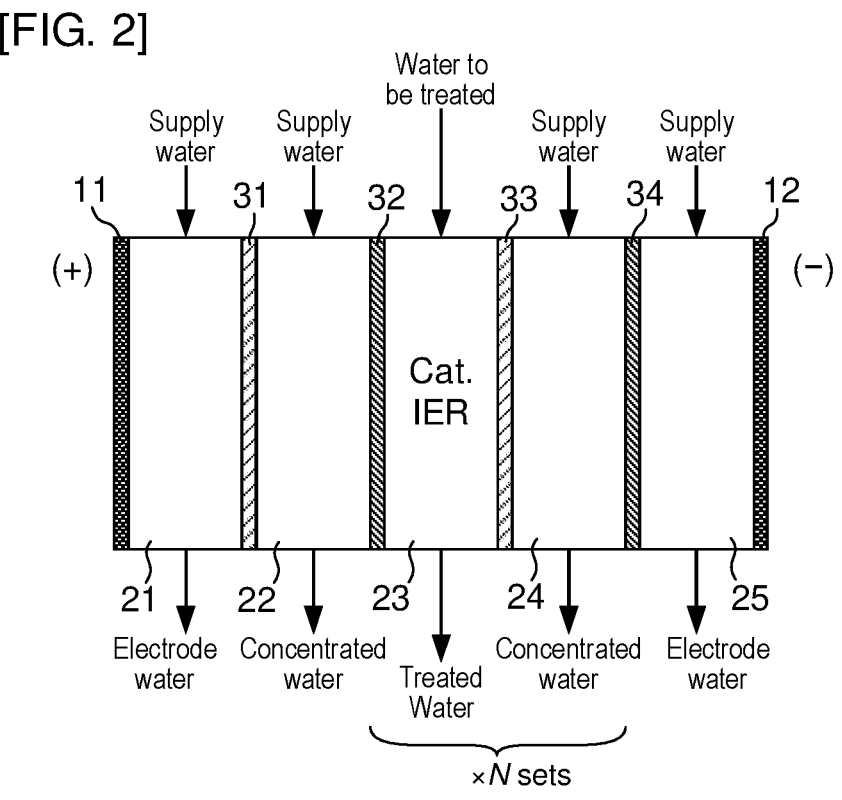
[FIG. 3]
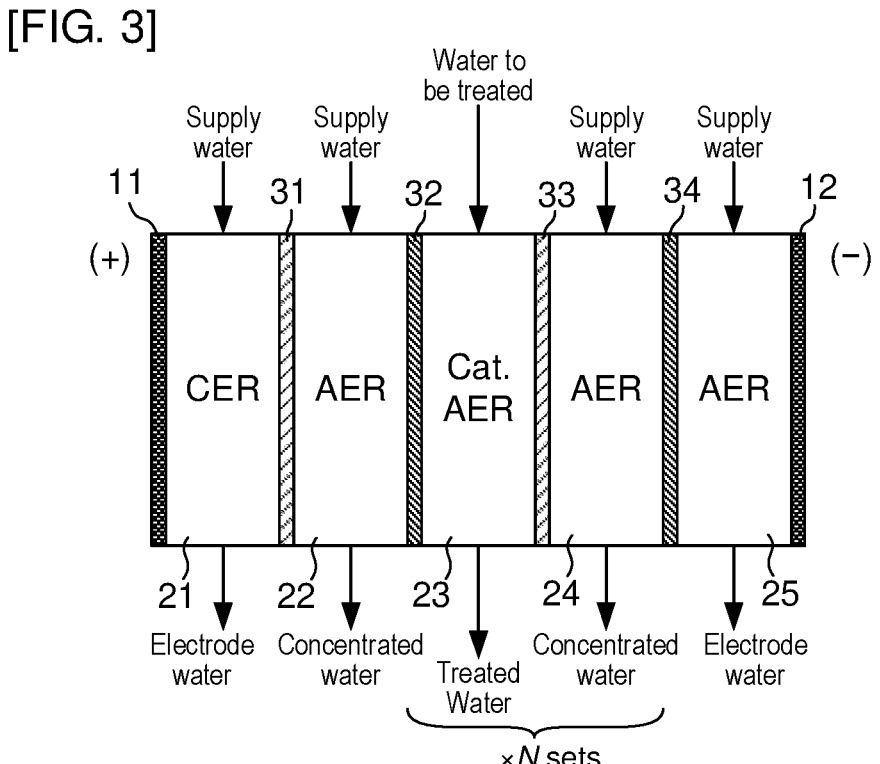

[FIG. 4]
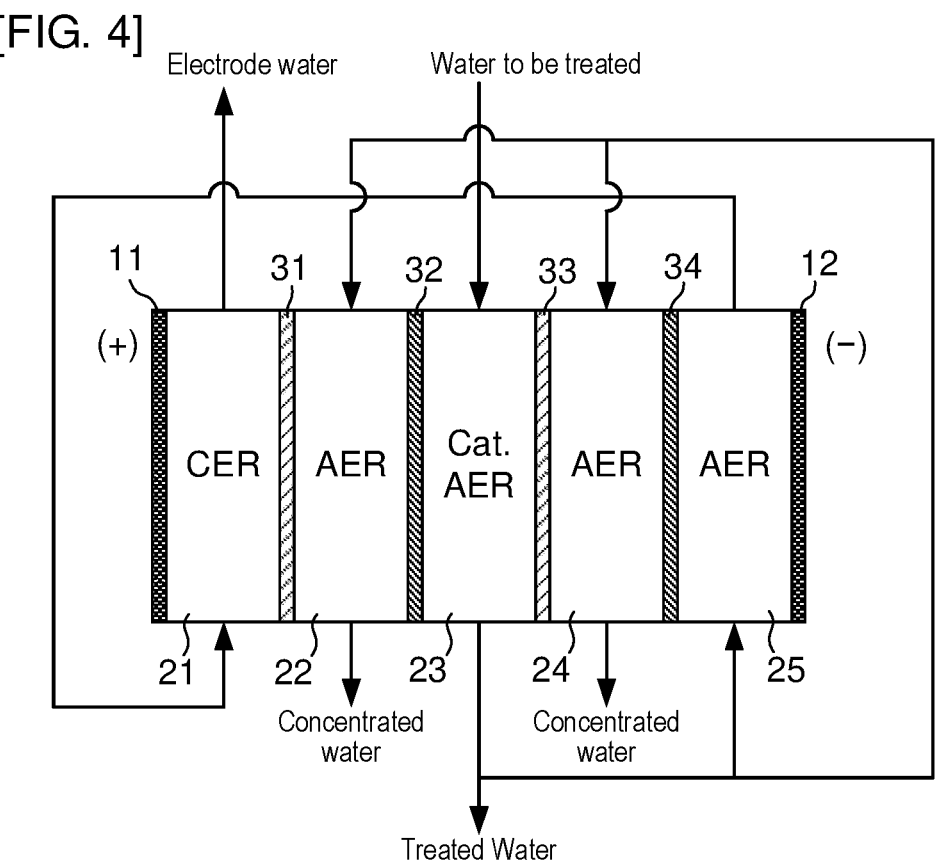
[FIG. 5]
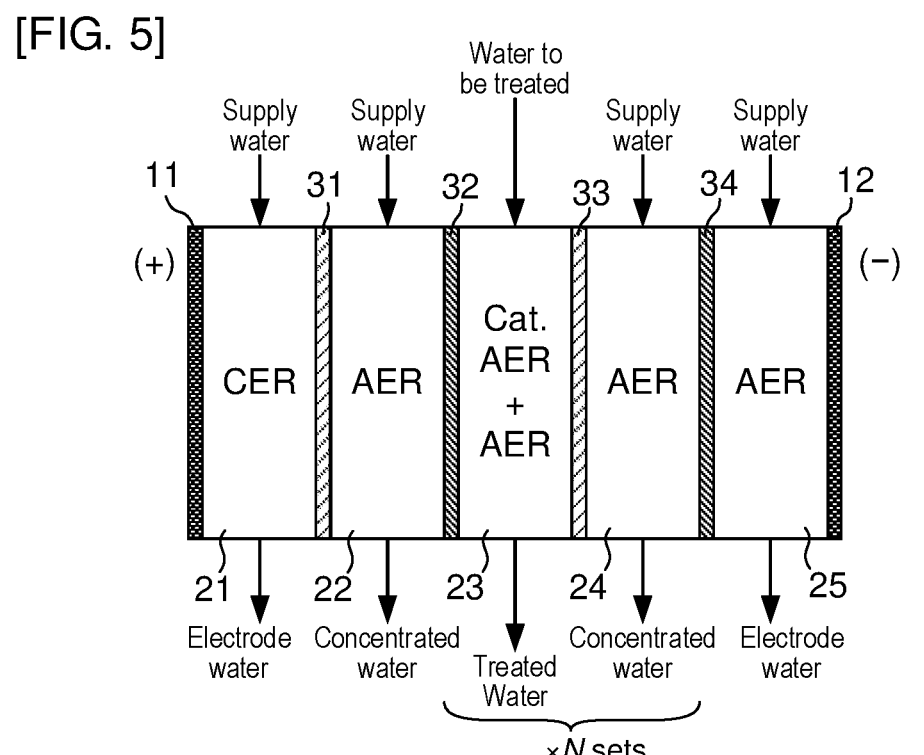

[FIG. 8]
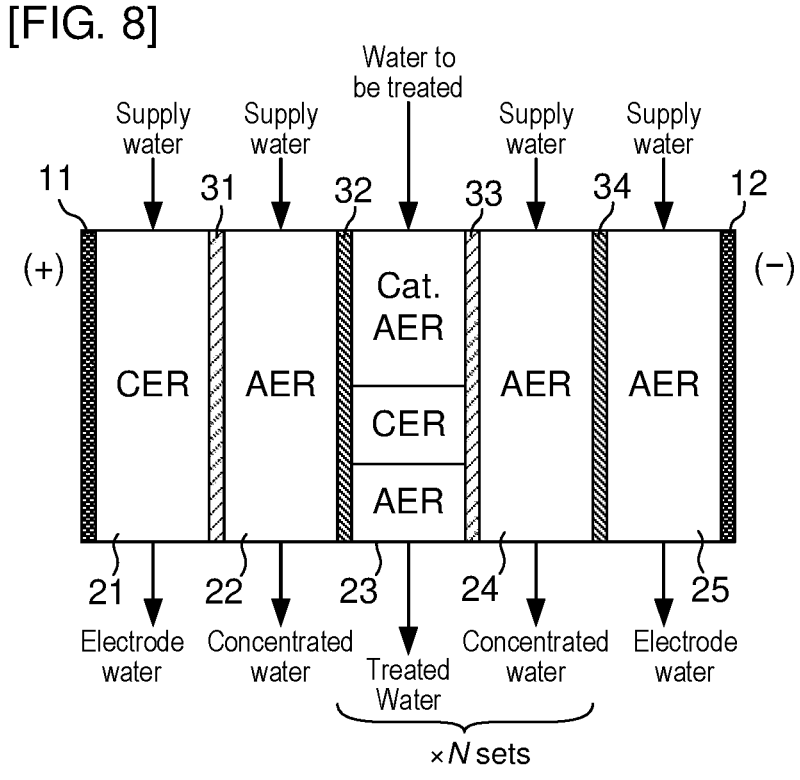
[FIG. 9]
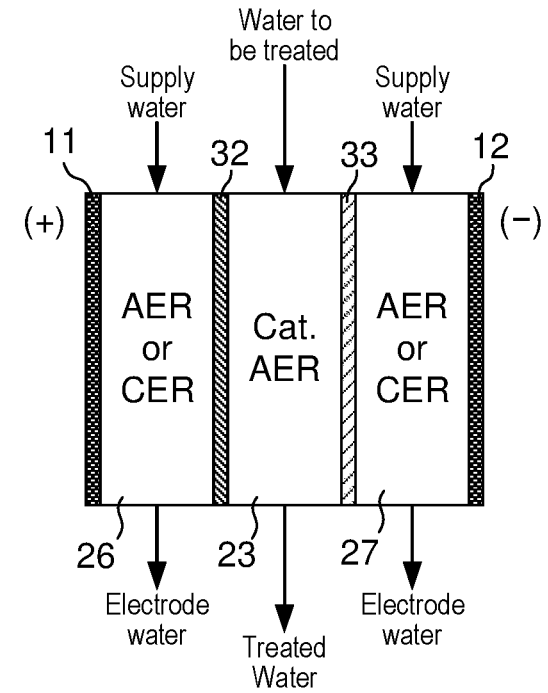

[FIG. 10]
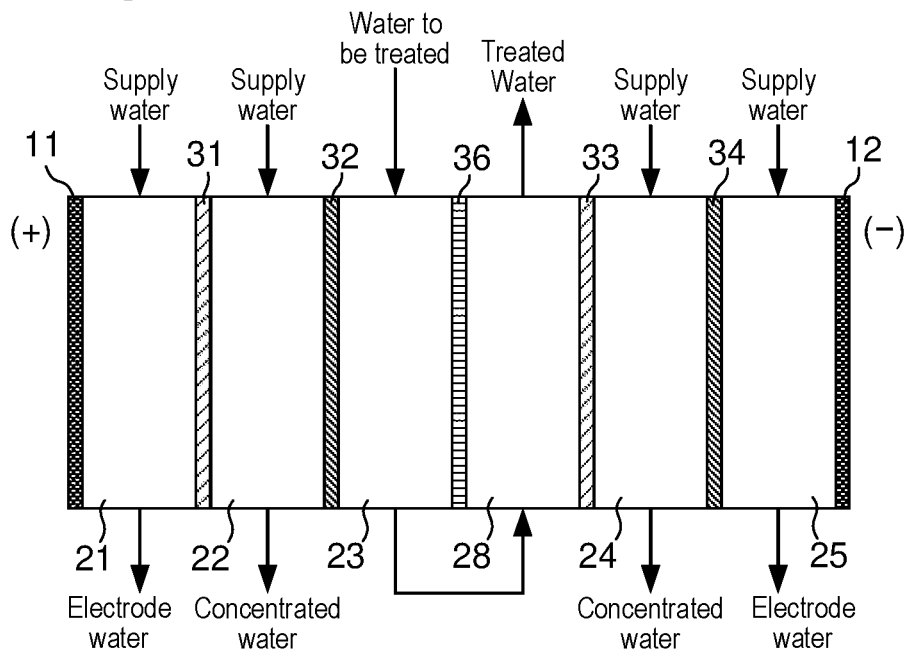
[FIG. 11]
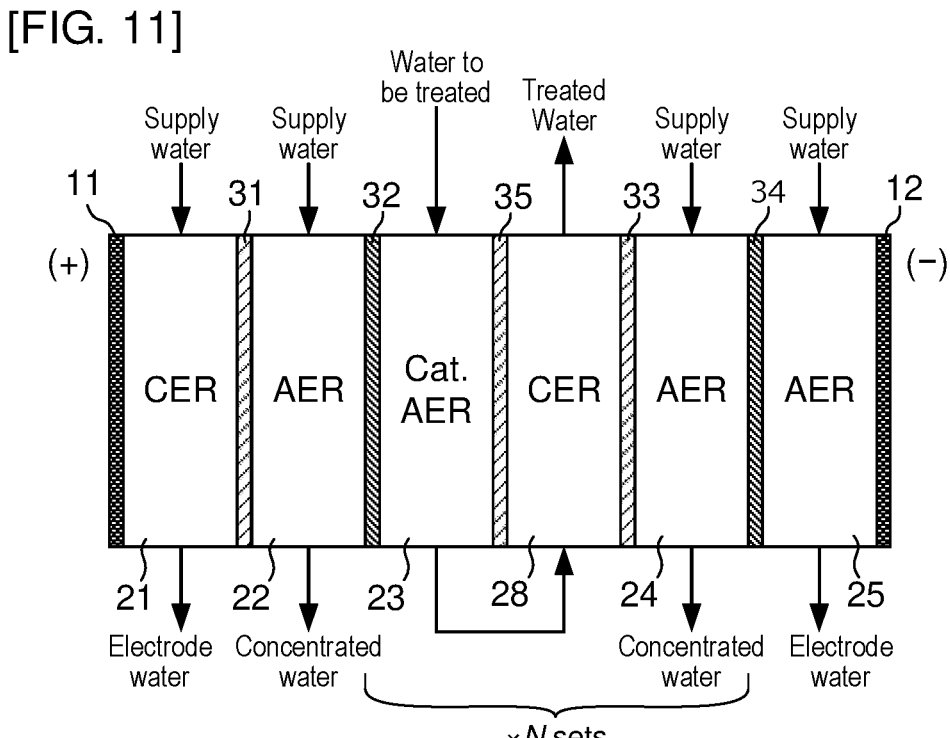

[FIG. 12]
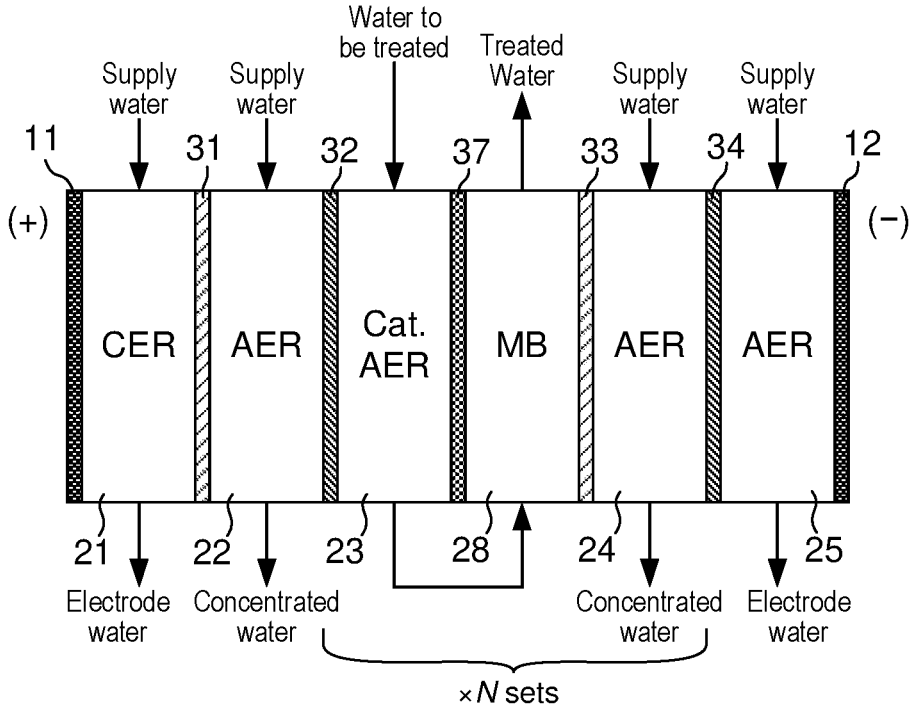
[FIG. 13]
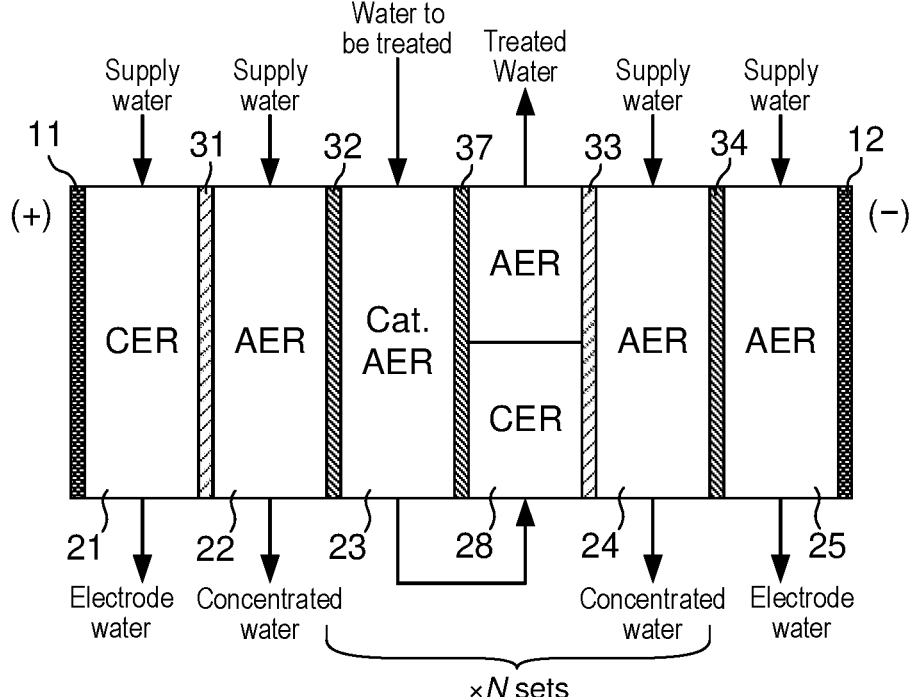

[FIG. 14]
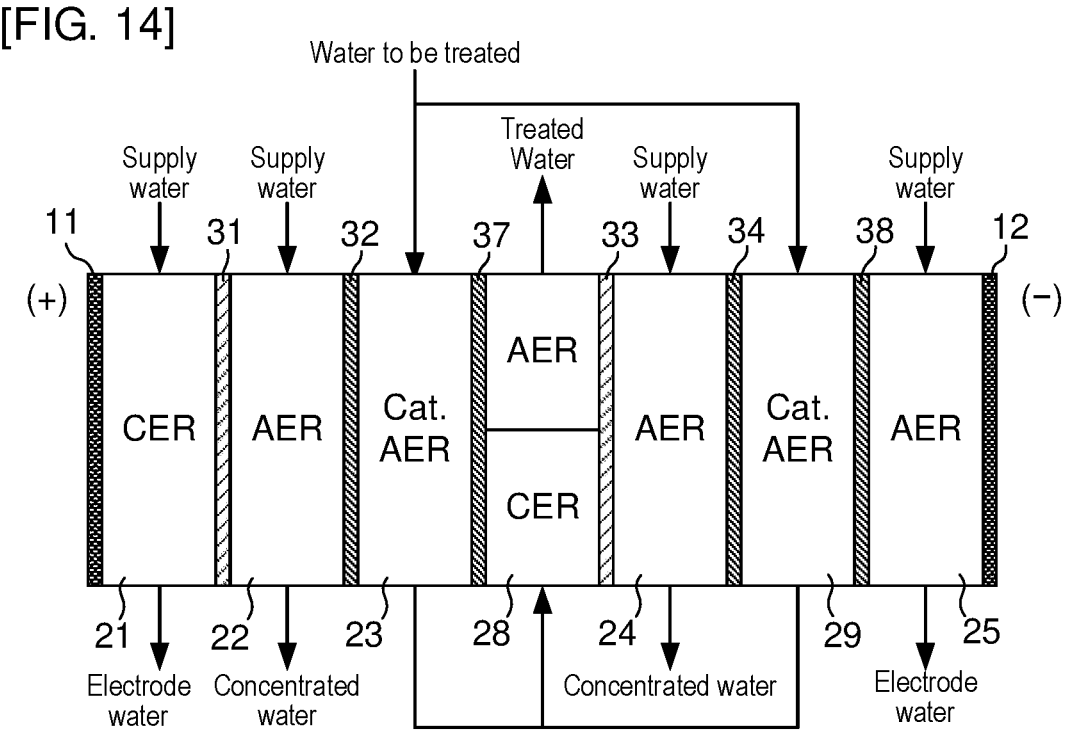
[FIG. 15]
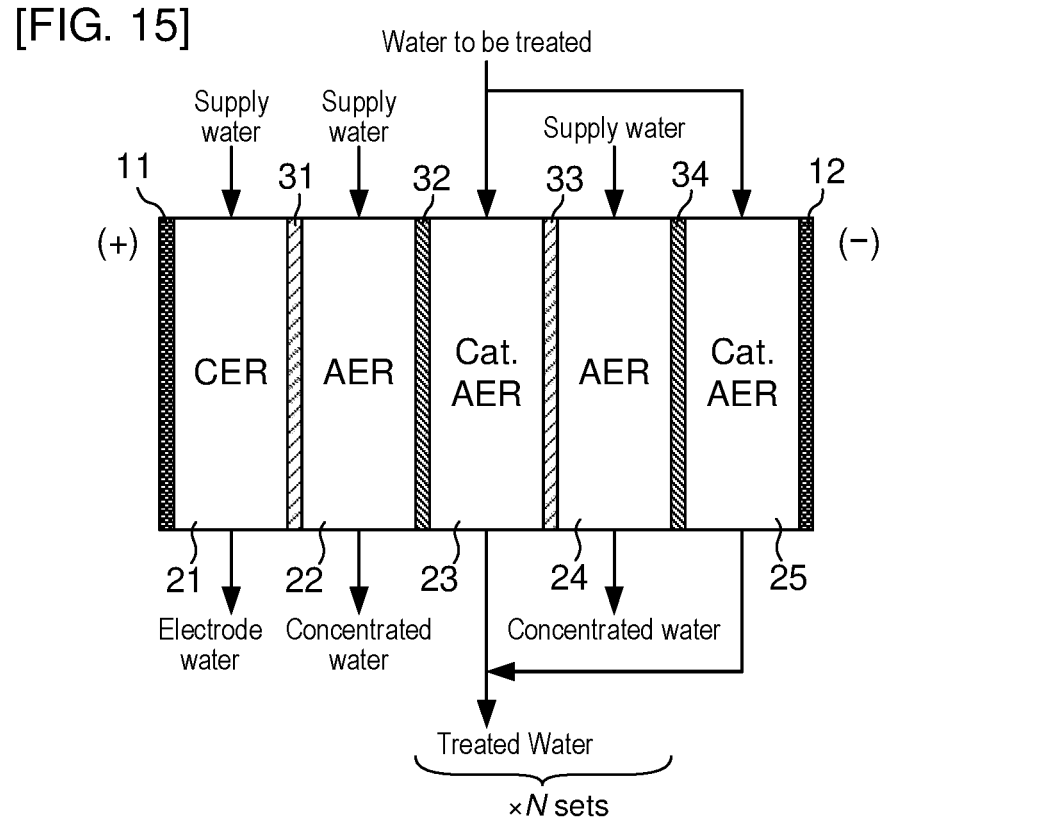

[FIG. 16]
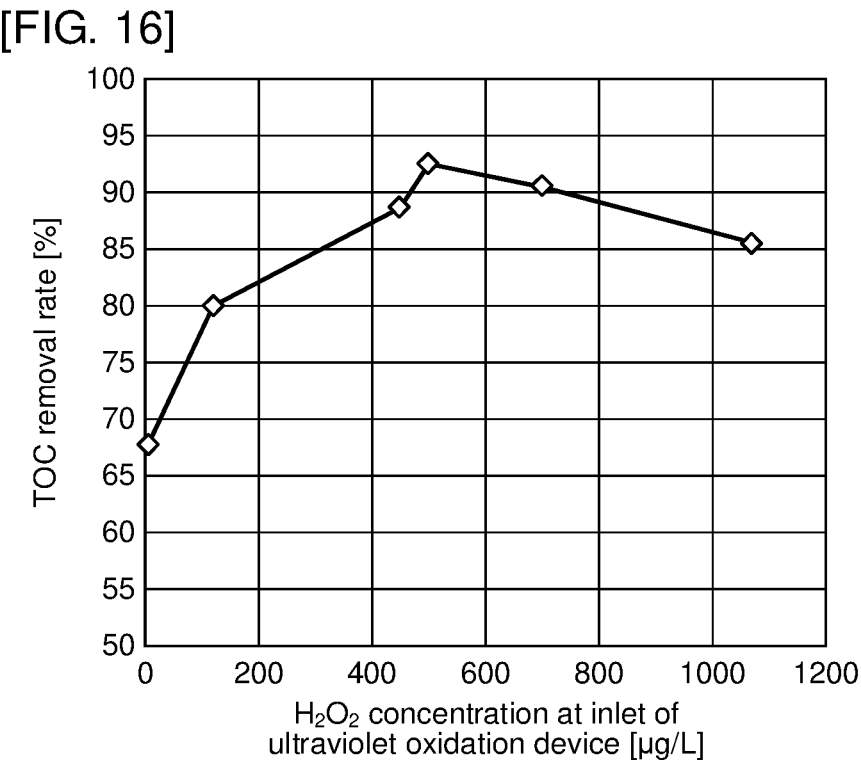
[FIG. 17]
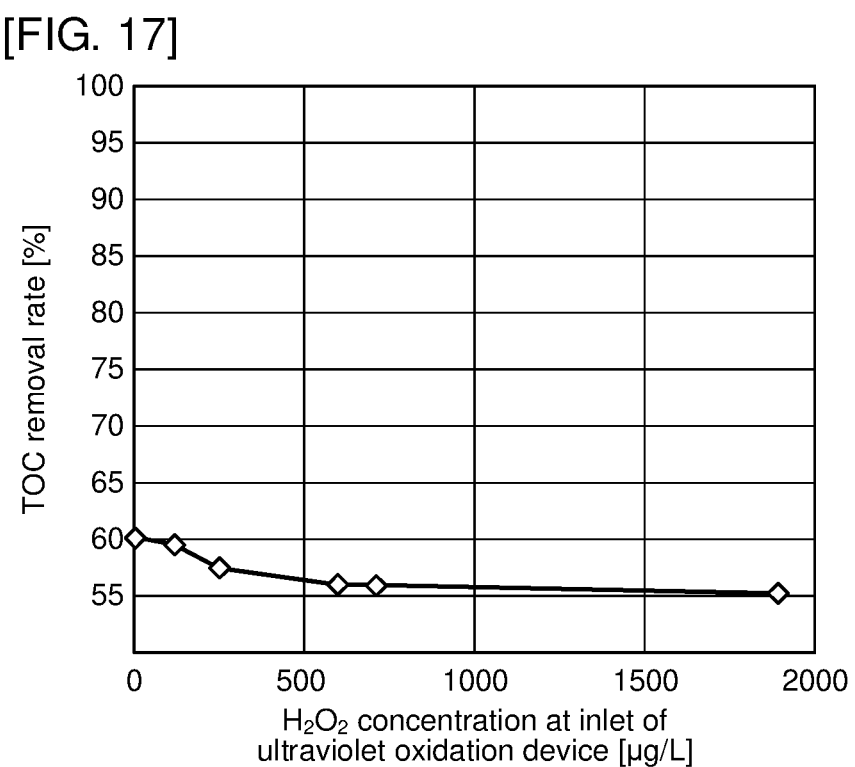

[FIG. 18]
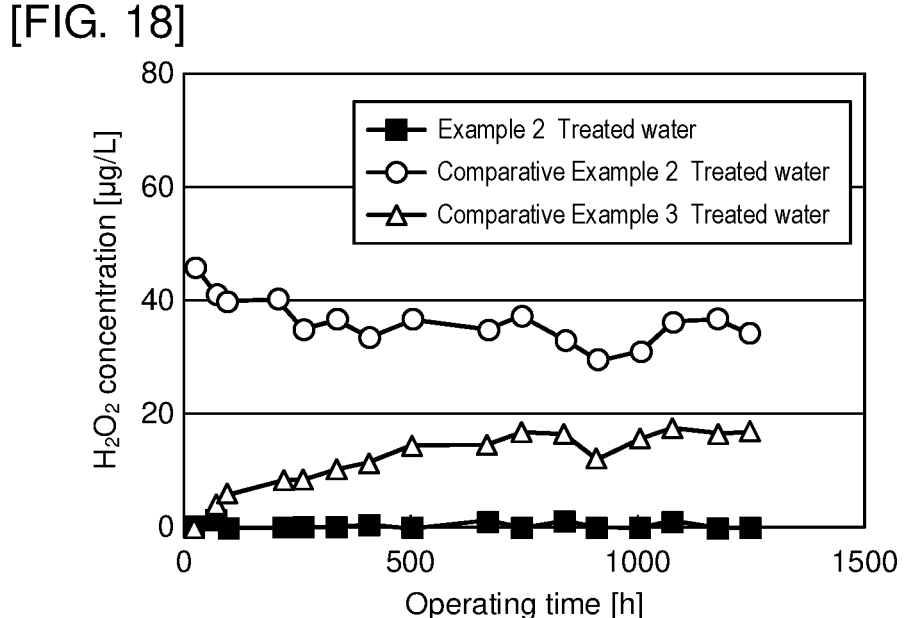

METHOD AND APPARATUS FOR TREATING WATER

TECHNICAL FIELD

The present invention relates to a water treatment method and apparatus for decomposing and removing organic substances in water to be treated.

BACKGROUND ART

Pure water such as ultrapure water from which organic substances, ionic components, fine particles, bacteria, etc. have been highly removed has been used as cleaning water in manufacturing processes of semiconductor devices, liquid crystal display devices and the like. In particular, when manufacturing electronic components including semiconductor devices, a large amount of pure water is used in the cleaning process, and the demand for water quality is increasing year by year. In the pure water used in the cleaning process of electronic component manufacturing and the like, it is required to bring the total organic carbon (TOC) concentration, which is one of the water quality control items, to a very low level in order to prevent organic substances contained in the pure water from carbonizing in the subsequent heat treatment process, the carbonation causing insulation failure or the like.

As a high demand for such pure water quality becomes apparent, various methods for decomposing and removing trace amounts of organic substances (TOC components) contained in pure water have been investigated in recent years. As a typical example of such a method, there is a step of decomposing and removing organic substances by ultraviolet oxidation treatment. In general, when organic substances are decomposed and removed by the ultraviolet oxidation treatment, used is an ultraviolet oxidation device which is equipped with a reaction tank made of, for example, a stainless steel, and a tubular low-pressure ultraviolet lamp installed in the reaction tank. The water to be treated is introduced into the reaction tank to be irradiated with ultraviolet light. As the ultraviolet lamp, a low-pressure ultraviolet lamp which generates ultraviolet light having wavelengths of, for example, 254 nm and 185 nm is used. When the water to be treated is irradiated with ultraviolet light including a wavelength of 185 nm, the ultraviolet decomposition of the water progresses and oxidizing species such as hydroxyl radicals (OH·) are generated in the water to be treated, and the trace organic substances in the water to be treated decompose into carbon dioxide ($CO_2$) and organic acids by the oxidizing ability of the oxidizing species. The treated water obtained by subjecting the water to be treated to the ultraviolet oxidation treatment in this way is then sent to an ion exchange device disposed in the subsequent stage, where carbon dioxide and organic acids are removed.

A low-pressure ultraviolet lamp is used in an oxidative decomposition method of TOC using a typical ultraviolet oxidation device. Despite the fact that ultraviolet lamps are very expensive, replacement of them is necessary, for example, about once a year due to the decrease in ultraviolet intensity over the course of use. Accordingly, the oxidative decomposition of TOC components using an ultraviolet oxidation device addresses the problem of reducing running costs such as reducing ultraviolet lamp replacement costs and reducing energy consumption. Therefore, in order to improve the decomposition efficiency of the TOC components, Patent Literature 1 proposes adding a predetermined amount of hydrogen peroxide ($H_2O_2$) to the preceding stage of an ultraviolet oxidation device using a low-pressure ultraviolet lamp. Ultraviolet light with a wavelength of 254 nm emitted from a low-pressure ultraviolet lamp reacts with hydrogen peroxide to generate hydroxyl radicals (OH·). Hydroxyl radicals produced by the decomposition of hydrogen peroxide also contribute to the decomposition of TOC components, so by adding hydrogen peroxide to the water to be treated prior to the ultraviolet oxidation treatment, the efficiency of decomposition of the TOC components is improved.

In the above. explained is the case where hydrogen peroxide is added to the water to be treated, which is, for example, tap water, and the ultraviolet oxidation treatment is performed to remove the TOC components for the production of pure water or ultrapure water. On the other hand, there is also a demand for removing TOC components from waste water discharged from various processes. In recent years, there has been a demand for promoting the effective use of water resources, and for example, there is a strong demand for water saving even in semiconductor device manufacturing factories that frequently use ultrapure water. In order to achieve water saving, it is effective to recover and reuse water that has been used once, and to increase the water recovery rate, studies are made on techniques for treating wastewater with a high TOC concentration after use at a use point, for example, and further for recovering and processing for reuse, that is, wastewater treatment techniques and wastewater recovery processing techniques. In order to recover and reuse wastewater with high TOC concentration as raw water for production of ultrapure water, it is necessary to reduce the TOC concentration to a level that does not deteriorate the quality of ultrapure water at the end points without incurring energy costs. As a technique for treating water having a high TOC concentration, there is a technique of adding an oxidizing agent such as hydrogen peroxide or ozone to the water to be treated and irradiating ultraviolet light to oxidize and decompose TOC. In this case, since the TOC concentration in the water to be treated is assumed to be on the order of mg/L and the water to be treated originally containing a large amount of various impurities is targeted, the ultraviolet irradiation is performed using a reaction vessel of an open system, and a low-pressure ultraviolet lamp or a high-pressure ultraviolet lamp generating a wavelength of 254 nm is generally used as the ultraviolet light source.

As a water treatment method that can also be used to remove organic components when treating and reusing waste water from processes, Patent Literature 2 discloses that, in order to improve the decomposition efficiency of organic substances and increase the TOC removal rate, when hydrogen peroxide is added to the water to be treated and then the water to be treated is subjected to the ultraviolet oxidation treatment, the amount of hydrogen peroxide added is adjusted in accordance with the dissolved oxygen concentration in the outlet water of the ultraviolet oxidation treatment.

As a technique related to the present invention, there is a technique for reducing the concentration of hydrogen peroxide in the water to be treated. Known as methods for reducing the concentration of hydrogen peroxide in water containing hydrogen peroxide are: a method of adding a reducing agent, a method of contacting with activated carbon, and a method of contacting with a catalyst carrying metal. In the method of adding a reducing agent, a reducing agent such as sodium sulfite, sodium hydrogen sulfite or sodium thiosulfate is added to water to be treated containing hydrogen peroxide. The rate of reaction between the reducing agent and hydrogen peroxide is very high, and hydrogen peroxide can be reliably decomposed and removed, but it is difficult to adjust the amount of reducing agent added. In addition, in the method of adding a reducing agent, it is necessary to add an excessive amount of the reducing agent in order to reliably remove hydrogen peroxide, which increases the amount of ions in the treated water and may lead to deterioration of the water quality of the treated water. In the method of contacting the water to be treated with activated carbon, a packed tower of activated carbon is usually provided and the water to be treated is passed through it. In this method, since the reaction rate is low, the space velocity of the water flow cannot be increased, and there is a problem that the size of equipment is increased. There is also concern that the activated carbon itself will be oxidized as the hydrogen peroxide decomposes, causing the particles to collapse.

As the method for decomposing and removing hydrogen peroxide by bringing it into contact with a resin carrying metal, for example, Patent Literature 3 has proposed a method of bringing the water to be treated into contact with a catalyst resin in which a palladium or platinum catalyst is supported on an ion exchange resin. In this method, hydrogen peroxide is decomposed by the reaction shown in the formula below.

$$2H_2O_2 \rightarrow 2H_2O + O_2$$

CITATION LIST

Patent Literature

[Patent Literature 1] JP 2011-218248 A
[Patent Literature 2] JP 2018-79448 A
[Patent Literature 3] JP 2007-185587 A

SUMMARY OF THE INVENTION

Technical Problem

With regard to adding hydrogen peroxide to decompose and remove TOC components and then performing the ultraviolet oxidation treatment of the water to be treated, it cannot be said that sufficient consideration has been given to the optimization of the amount of hydrogen peroxide added and the effects of residual hydrogen peroxide in the outlet water of the ultraviolet oxidation treatment on devices on the subsequent stage. In addition, although the treated water of the ultraviolet oxidation device contains carbonic acid components (carbonate ions, hydrogen carbonates ions and free carbonic acid), the effects of the carbonic acid components on the removal of hydrogen peroxide has not been sufficiently investigated.

It is an object of the present invention to provide a water treatment method and apparatus that improve the efficiency of decomposition of organic substances in water to be treated and have less effect on subsequent-stage devices.

Solution to Problem

The present inventors confirmed that, when the decomposition treatment of TOC components in the water to be treated is performed by adding hydrogen peroxide and then irradiating ultraviolet light to perform ultraviolet oxidation treatment, the treated water after this treatment, that is, the outlet water of ultraviolet oxidation treatment, contains a certain concentration of hydrogen peroxide. Hydrogen peroxide is an oxidizing agent and is known to cause irreversible damage to devices containing ion exchange resins and devices such as degassing membranes. In particular, it is known that the ion exchange resins packed in an EDI (electrodeionization) device is susceptible to deterioration in the presence of an oxidizing agent. Therefore, in the present invention, the outlet water from the ultraviolet oxidation treatment is supplied to a specific hydrogen peroxide removal device to perform the hydrogen peroxide removal treatment. The treated water obtained by the hydrogen peroxide removal treatment is supplied to, for example, an EDI device, a membrane degassing device, or a non-regenerative ion exchange resin device (cartridge polisher).

Therefore, the water treatment method according to the present invention is a water treatment method for decomposing organic substances contained in water to be treated, including: a step of adding hydrogen peroxide to the water to be treated; an ultraviolet irradiation step of irradiating the water to be treated to which hydrogen peroxide has been added with ultraviolet light; and a hydrogen peroxide removal step of removing hydrogen peroxide contained in outlet water from the ultraviolet irradiation step, wherein the hydrogen peroxide removal step includes: a step of applying a DC current between an anode and a cathode; and a step of passing the water to be treated into a hydrogen peroxide removal chamber arranged between the anode and the cathode and provided with a metal catalyst with ability of decomposing hydrogen peroxide.

The water treatment apparatus according to the present invention is a water treatment apparatus that decomposes organic substances contained in water to be treated, including: a hydrogen peroxide adding means for adding hydrogen peroxide to the water to be treated; an ultraviolet irradiation means for irradiating the water to be treated to which hydrogen peroxide has been added with ultraviolet light a hydrogen peroxide removal means for removing hydrogen peroxide contained in outlet water from the ultraviolet irradiation means, wherein the hydrogen peroxide removing means comprises: an anode and a cathode; and a hydrogen peroxide removal chamber disposed between the anode and the cathode and provided with a metal catalyst with ability of decomposing hydrogen peroxide, and wherein a DC current is applied between the anode and the cathode.

In the present invention, a metal catalyst capable of decomposing hydrogen peroxide is provided in the hydrogen peroxide removal chamber disposed between the anode and the cathode, and a DC current is applied between the anode and the cathode while the water to be treated is passed through the hydrogen peroxide removal chamber. The application of the DC current may be performed constantly or intermittently during the period in which the water to be treated is passed through the hydrogen peroxide removal chamber. Alternatively, the water to be treated may be intermittently supplied to the hydrogen peroxide removing chamber while the DC current is applied continuously or intermittently. For example, in the water treatment method according to the present invention, the step of applying a DC current between the anode and the cathode and the step of passing the water to be treated through the hydrogen peroxide removal chamber are performed simultaneously or separately in the hydrogen peroxide removing step. The outlet water of the ultraviolet irradiation means for irradiating the water to be treated with ultraviolet light for ultraviolet oxidation treatment contains carbonic acid components and the like, which may inhibit the decomposition of hydrogen peroxide by the metal catalyst. According to the present invention, both the decomposition of hydrogen peroxide and the removal of carbonic acid components and the like from the hydrogen peroxide removal chamber proceed, so that the performance of decomposition and removal of hydrogen peroxide can be stably maintained high over a long period of time.

In the present invention, the metal catalyst is preferably provided in the hydrogen peroxide removal chamber by filling the hydrogen peroxide removal chamber with an ion exchange resin which carries a metal catalyst capable of decomposing hydrogen peroxide. When the metal catalyst is carried on an ion exchange resin, carbonic acid components are adsorbed on the ion exchange resin, but by applying a voltage between the anode and the cathode, decomposition of hydrogen peroxide and electric regeneration of the ion exchange resin proceed in parallel, the performance of decomposition and removal of hydrogen peroxide can be more stably maintained at a high level over a long period of time.

The metal catalysts capable of decomposing hydrogen peroxide in the present invention include, for example, platinum group metal catalysts such as palladium and platinum, as well as iron, manganese, nickel, gold, silver, copper, chromium, aluminum, and compounds thereof. Among them, platinum group metal catalysts are more preferably used because of their high catalytic activity for hydrogen peroxide decomposition. The platinum group metal catalyst is a catalyst containing one or more metals selected from ruthenium, rhodium, palladium, osmium, iridium and platinum. The platinum group metal catalyst may contain any one of these metallic elements alone, or may contain two or more of these metallic elements in combination. Among these, platinum, palladium, and platinum-palladium alloys have high catalytic activity and are suitably used as the platinum group metal catalysts.

The present invention can further demonstrate its advantages by using an anion exchanger supporting the platinum group metal catalyst as the metal catalyst when removing hydrogen peroxide from water to be treated containing carbonic acid components that are loads on the anion exchanger. When the hydrogen peroxide removal chamber is partitioned by an anion exchange membrane on its side facing the anode, the anion component, that is, the carbonic acid component, adsorbed on the anion exchanger in the hydrogen peroxide removal chamber from the water to be treated is desorbed from the anion exchanger by electric regeneration, and then discharged in the form of an anion from the hydrogen peroxide removal chamber through the anion exchange membrane on the anode side. That is, according to the present invention, it is possible not only to produce treated water from which hydrogen peroxide has been removed, but also to improve the quality of the treated water.

The present invention may be configured such that a deionization chamber filled with an ion exchanger is provided adjacent to the cathode side or the anode side of the hydrogen peroxide removal chamber via an intermediate ion exchange membrane, and the treated water that has been treated in the hydrogen peroxide removal chamber is passed through the deionization chamber. With this configuration, removal of hydrogen peroxide from the water to be treated and deionization of the water to be treated can be performed simultaneously.

Advantageous Effect of Invention

According to the present invention, it is possible to obtain a water treatment method and apparatus that improve the decomposition efficiency of organic substances in the water to be treated and that have little effect on the subsequent-stage devices.

BRIEF DESCRIPTION OF DRAWINGS

FIG. 1A is a flow diagram showing a water treatment apparatus according to an embodiment of the present invention;

FIG. 1B is a flow diagram showing a water treatment apparatus according to another embodiment of the present invention;

FIG. 1C is a flow diagram showing a water treatment apparatus according to still another embodiment of the present invention;

FIG. 1D is a flow diagram showing a water treatment apparatus according to yet another embodiment of the present invention;

FIG. 2 is a schematic diagram showing the configuration of the hydrogen peroxide removal device of the first configuration example;

FIG. 3 is a schematic diagram showing a specific example of the hydrogen peroxide removal device;

FIG. 4 is a schematic diagram showing an example of water flow in the hydrogen peroxide removal device shown in FIG. 3;

FIG. 5 is a schematic diagram showing another specific example of the hydrogen peroxide removal device;

FIG. 6 is a schematic diagram showing another specific example of the hydrogen peroxide removal device;

FIG. 7 is a schematic diagram showing another specific example of the hydrogen peroxide removal device;

FIG. 8 is a schematic diagram showing another specific example of the hydrogen peroxide removal device;

FIG. 9 is a schematic diagram showing another specific example of the hydrogen peroxide removal device;

FIG. 10 is a schematic diagram showing the configuration of the hydrogen peroxide removal device of the second configuration example;

FIG. 11 is a schematic diagram showing another specific example of the hydrogen peroxide removal device;

FIG. 12 is a schematic diagram showing another specific example of the hydrogen peroxide removal device;

FIG. 13 is a schematic diagram showing another specific example of the hydrogen peroxide removal device;

FIG. 14 is a schematic diagram showing another specific example of the hydrogen peroxide removal device;

FIG. 15 is a schematic diagram showing another specific example of the hydrogen peroxide removal device;

FIG. 16 is a graph showing the results of Example 1;

FIG. 17 is a graph showing the results of Comparative Example 1; and

FIG. 18 is a graph showing the results of Example 2 and Comparative Examples 2 and 3.

DESCRIPTION OF EMBODIMENTS

Next, embodiments of the present invention will be described with reference to the drawings. However, the invention is not limited to the embodiments shown in the drawings.

FIG. 1A shows a water treatment apparatus according to an embodiment of the present invention. This water treatment apparatus decomposes and removes organic components in water to be treated by ultraviolet oxidation treatment. The water treatment apparatus includes: hydrogen peroxide source 101 provided for supplying hydrogen peroxide ($H_2O_2$) to the pipe of the water to be treated; ultraviolet oxidation device 103 for performing ultraviolet oxidation treatment by irradiating the water to be treated to which hydrogen peroxide has been added; and hydrogen peroxide removal device 105 that removes hydrogen peroxide contained in the outlet water of ultraviolet oxidation device 103. Ultraviolet oxidation device 103 is the ultraviolet irradiation means, and the outlet water of hydrogen peroxide removal device 105 is the treated water obtained from this water treatment apparatus. For example, an aqueous solution of hydrogen peroxide is stored in hydrogen peroxide source 101, and hydrogen peroxide is added to the water to be treated by adding the aqueous solution of hydrogen peroxide to the water to be treated. The reason why hydrogen peroxide is added to the water to be treated in the present embodiment is to increase the decomposition efficiency of organic substances in the ultraviolet oxidation treatment, as disclosed in Patent Literature 1. Therefore, as ultraviolet oxidation device 103, for example, a device which is described in, for example, Patent Literature 1 and equipped with a low-pressure ultraviolet lamp emitting ultraviolet light with wavelengths of 254 nm and 185 nm can be used. A high-pressure ultraviolet lamp emitting ultraviolet light with a wavelength of 254 nm can also be used. A mercury lamp is used as a lamp that emits ultraviolet light, but an ultraviolet LED (light emitting diode), for example, can also be used.

As will become clear from Examples and Comparative Examples to be described later, the outlet water of ultraviolet oxidation device 103 contains hydrogen peroxide. If this outlet water is directly used in devices on the subsequent stage such as an ion exchange device, an EDI device, a membrane degassing device or the like, these devices may be damaged. Therefore, in the apparatus of this embodiment, the outlet water of ultraviolet oxidation device 103 is treated by hydrogen peroxide removal device 105 to remove hydrogen peroxide. When the treated water obtained from hydrogen peroxide removal device 105 is supplied to a subsequent-stage device, the inflow amount of hydrogen peroxide to the subsequent-stage device can be reduced, and the occurrence of damage or the like in the subsequent-stage device can be suppressed. In this embodiment, used as hydrogen peroxide removal device 105 is a device which includes: an anode and a cathode; and a hydrogen peroxide removal chamber which is disposed between the anode and the cathode and provided with a metal catalyst capable of decomposing hydrogen peroxide, a DC current being applied between the anode and the cathode. A specific configuration of hydrogen peroxide removing device 105 will be described later, but such hydrogen peroxide removing device 105 can have not only a function of removing hydrogen peroxide but also a deionization function. In the decomposition and removal of organic substances by ultraviolet oxidation treatment, carbonic acid components such as carbon dioxide, and organic acids are generated, but by imparting a deionization function to hydrogen peroxide removal device 105, it becomes possible to omit the ion exchange device for removing carbonic acid components and organic acids that has been provided in the subsequent stage of the ultraviolet oxidation device. Furthermore, an ion removal device may be installed in a preceding stage of the ultraviolet oxidation device. Specifically, at least one of a reverse osmosis membrane separation device, an ion exchange device, an EDI device, and the like can be provided as the ion removal device at the preceding stage of the ultraviolet oxidation device. By removing the ionic organic substances (for example, organic acids) in advance in these devices installed in the preceding stage of the ultraviolet oxidation treatment, the amount of organic substances that must be treated by the ultraviolet oxidation device can be reduced, and the reduction in the size of the ultraviolet oxidation device can be achieved.

FIG. 1B shows the configuration of a water treatment device according to another embodiment of the present invention. As will be apparent from Comparative Examples described later, when the dissolved oxygen (DO) concentration in the inlet water to the ultraviolet oxidation treatment is high, the TOC (total organic carbon) removal rate in the ultraviolet oxidation treatment does not become high even if the inlet water contains hydrogen peroxide. According to the results of Comparative Examples, when the dissolved oxygen concentration in the inlet water to the ultraviolet oxidation treatment exceeded 3 mg/L, the decomposition efficiency of organic substances did not increase even when hydrogen peroxide was added to the water to be treated. Therefore, the water treatment apparatus shown in FIG. 1B is one obtained by arranging membrane degassing device 104 for removing dissolved oxygen in the water to be treated at the portion for receiving the water to be treated, in the water treatment apparatus shown in FIG. 1A. The outlet water of membrane degassing device 104 is supplied to ultraviolet oxidation device 103 after being added with hydrogen peroxide. Membrane degassing device 104 removes oxygen in the water to be treated so that the dissolved oxygen concentration in its outlet water is 3 mg/L or less. An oxygen removal device other than membrane degassing device 104 may be used. For example, an oxygen removal device may be used in which hydrogen ($H_2$) is added to the water to be treated, and then the water is passed through a palladium (Pd) catalyst or platinum (Pt) catalyst to react oxygen and hydrogen to form water and perform deoxygenation.

FIG. 1C shows the configuration of a water treatment device according to still another embodiment of the present invention. Since the TOC removal rate varies depending on the concentration of hydrogen peroxide in the outlet water of the ultraviolet oxidation treatment as will be clear from Examples described later, it is preferable to vary the amount of hydrogen peroxide added to the water to be treated in accordance with hydrogen peroxide concentration of the outlet water of the ultraviolet oxidation treatment. Therefore, the water treatment apparatus shown in FIG. 1C is obtained by, in the water treatment apparatus shown in FIG. 1A, arranging hydrogen peroxide injection amount adjusting means 102 at the outlet of hydrogen peroxide source 102 as well as providing hydrogen peroxide meter ($H_2O_2$ meter) 106 for measuring hydrogen peroxide concentration of the outlet water of ultraviolet oxidation device 103. By controlling hydrogen peroxide injection amount adjusting means 102 based on the hydrogen peroxide concentration measured by hydrogen peroxide meter 106, hydrogen peroxide is added to the water to be treated in accordance with the hydrogen peroxide concentration of the outlet water of ultraviolet oxidation device 103. Specifically, it is preferable to adjust the amount of hydrogen peroxide added to the water to be treated so that the hydrogen peroxide concentration measured by hydrogen peroxide meter 106 is 500 μg/L or less. In the configuration shown in FIG. 1C, since the outlet water of ultraviolet oxidation device 103 is directly supplied to hydrogen peroxide removal device 105, the hydrogen peroxide concentration in the outlet water of ultraviolet oxidation device 103 and the hydrogen peroxide concentration in the inlet water of hydrogen peroxide removal device 105 are equal to each other. However, some device may be provided between the outlet of ultraviolet oxidation device 103 and the inlet of hydrogen peroxide removal device 105, and the hydrogen peroxide concentration may change due to the device. In such a case, it is possible to adjust the amount of hydrogen oxide added to the water to be treated based on at least one of the hydrogen peroxide concentration in the outlet water of ultraviolet oxidation device 103 and the hydrogen peroxide concentration in the inlet water of hydrogen peroxide removal device 105. As hydrogen peroxide injection amount adjusting means 102, any configuration can be used as long as it can adjust the amount of hydrogen peroxide added from hydrogen peroxide source 101 to the water to be treated. For example, a pump (P) for injecting chemicals can be used.

FIG. 1D shows the configuration of a water treatment device according to yet another embodiment of the present invention. As will be clear from Examples described later, since the TOC removal rate fluctuates according to the dissolved oxygen concentration in the outlet water of the hydrogen peroxide removal treatment, it is preferable to vary the amount of hydrogen peroxide added to the water to be treated water in accordance with the dissolved oxygen concentration in the outlet water of the hydrogen peroxide removal treatment. Therefore, the water treatment apparatus shown in FIG. 1D is one obtained by, in the water treatment apparatus shown in FIG. 1A, providing hydrogen peroxide injection amount adjusting means 102 at the outlet of hydrogen peroxide source 102 as described above as well as providing dissolved oxygen meter (DO meter) 107 for measuring dissolved oxygen concentration of the outlet water of hydrogen peroxide removal device 105. By controlling hydrogen peroxide injection amount adjusting means 102 based on the dissolved oxygen concentration measured by dissolved oxygen meter 107, hydrogen peroxided is added to the water to be treated in accordance with the dissolved oxygen concentration in the outlet water of hydrogen peroxide removal device 105. Specifically, it is preferable to adjust the amount of hydrogen peroxide added to the water to be treated so that the dissolved oxygen concentration measured by dissolved oxygen meter 107 is 0.3 mg/L or less. The means for measuring various concentrations such as the dissolved oxygen concentration may be one for constant measurement or one for measurement each time. Furthermore, on-line sampled water may be measured separately and the amount of hydrogen peroxide added may be adjusted based on that measured value.

Next, the configuration of hydrogen peroxide removal device 105 that can be preferably used in the water treatment devices shown in FIGS. 1A, 1B, 1C and 1D will be described. As described above, hydrogen peroxide removal device 105 is a device which includes: an anode and a cathode; and a hydrogen peroxide removal chamber disposed between the anode and the cathode and provided with a metal catalyst capable of decomposing hydrogen peroxide, wherein a DC current is applied between the anode and the cathode. The metal catalyst is usually supported on some kind of carrier, but it is preferable to use an ion exchanger such as an ion exchange resin as the carrier. In such a case, assuming that the ion exchanger is filled into the hydrogen peroxide removal chamber, at least a portion of the ion exchanger filled in the hydrogen peroxide removal chamber is made an ion exchanger carrying the metal catalyst. The hydrogen peroxide removal chamber disposed between the anode and the cathode is partitioned on each of the anode side and the cathode side. At this time, it is preferable to partition the hydrogen peroxide removal chamber using an ion exchange membrane. The cathode side of the hydrogen peroxide removal chamber can be partitioned by the cathode itself. Configuration examples of such hydrogen peroxide removing device 105 will be described below. In the following description of the configuration of hydrogen peroxide removal device 105, the water to be treated is water supplied to the hydrogen peroxide removal chamber of hydrogen peroxide removal device 105, and typically the outlet water of ultraviolet oxidation device 103 in the water treatment apparatuses shown in FIGS. 1A, 1B, 1C and 1D.

FIG. 2 shows the configuration of the hydrogen peroxide removing device in the first configuration example. The hydrogen peroxide removal device includes at least one hydrogen peroxide removal chamber 23 between anode chamber 21 provided with anode 11 and cathode chamber 25 provided with cathode 12. Hydrogen peroxide removal chamber 23 is partitioned by a first ion exchange membrane located on the side facing anode 11 and a second ion exchange membrane located on the side facing cathode 12. Hydrogen peroxide removing chamber 23 is filled with an ion exchanger carrying a metal catalyst having abilities of decomposing hydrogen peroxide. In the example shown in FIG. 2, the first ion exchange membrane arranged on the side facing anode 11 is anion exchange membrane 32, and the second ion exchange membrane arranged on the side facing cathode 12 is cation exchange membrane 33. Hydrogen peroxide removing chamber 23 is filled with an ion exchanger (IER) on which a platinum group metal catalyst is supported. In the drawing, the ion exchanger supporting the platinum group metal catalyst is represented by "Cat. IER." Specifically, in the hydrogen peroxide removal device shown in FIG. 2, anode 11 and cathode 12 face each other, and anode chamber 21, first concentration chamber 22, hydrogen peroxide removal chamber 23, second concentration chamber 24, and cathode chamber 25 are arranged in this order from the side of anode 11 between anode 11 and cathode 12. Anode chamber 21 and first concentration chamber 22 are partitioned by cation exchange membrane 31; first concentration chamber 22 and hydrogen peroxide removal chamber 23 are partitioned by anion exchange membrane 32; hydrogen peroxide removal chamber 23 and second concentration chamber 24 is partitioned by cation exchange membrane 33; and second concentration chamber 24 and cathode chamber 25 are partitioned by anion exchange membrane 34. Anode chamber 21, first concentration chamber 22, second concentration chamber 24 and cathode chamber 25 are each filled with an ion exchanger that does not carry the platinum group metal catalyst. Here, as the ion exchanger, either an anion exchanger or a cation exchanger, or both of them are used. When both the anion exchanger and the cation exchanger are used, the packing form of the ion exchangers may be a mixed bed configuration in which the anion exchanger and the cation exchanger are mixed and packed, or a multilayered bed configuration in which a layer of an anion exchanger and a layer of a cation exchanger are filled so that these layers are formed, respectively.

Next, the operation of the hydrogen peroxide removing device shown in FIG. 2 will be described. When removing hydrogen peroxide from the water to be treated containing hydrogen peroxide, supply water is passed through each of anode chamber 21, first concentration chamber 22, second concentration chamber 24 and cathode chamber 25, and the water to be treated is passed through hydrogen peroxide removal chamber 23 in a state in which a DC current is applied between anode 11 and cathode 12. When the water to be treated containing hydrogen peroxide is passed through hydrogen peroxide removal chamber 23, hydrogen peroxide in the water to be treated is decomposed into water and oxygen by a catalytic reaction with the platinum group metal catalyst supported on the ion exchanger in hydrogen peroxide removal chamber 23. As a result, the treated water from which hydrogen peroxide is removed flows out from hydrogen peroxide removal chamber 23. At this time, in hydrogen peroxide removal chamber 23, a dissociation reaction of water ($H_2O \rightarrow H^+ + OH^-$) occurs simultaneously due to a potential difference generated by the applied current at an interface between different kinds of ion exchangeable substances, and hydrogen ions (Fr) and hydroxide ions (OW) are generated. The interface of the different kinds of ion exchangeable materials is, for example, an interface between an anion exchange membrane and a cation exchanger, an interface between a cation exchange membrane and an anion exchanger, or an interface between a cation exchanger and an anion exchanger. By the hydrogen ions and the hydroxide ions thus generated, the ionic components previously adsorbed on the ion exchanger in hydrogen peroxide removal chamber 23 are ion-exchanged and desorbed from the ion exchanger. Of the desorbed ionic components, anions move through anion exchange membrane 32 to first concentration chamber 22 closer to anode 11, and are then discharged as concentrated water from this first concentration chamber 22. On the other hand, cations move through cation exchange membrane 33 to second concentration chamber 24 closer to cathode 12, and are discharged as concentrated water from this second concentration chamber 24. Eventually, the ionic components in the water to be treated supplied to hydrogen peroxide removal chamber 23 transfer to first concentration chamber 22 and second concentration chamber 24 and are then discharged, and at the same time, the ion exchanger in hydrogen peroxide removal chamber 23 is also regenerated. Incidentally, the electrode water is discharged from each of anode chamber 21 and cathode chamber 25. The application of the DC current may be continuously performed at the time of passing the water to be treated, or may be performed intermittently. Furthermore, the water to be treated may be intermittently supplied to hydrogen peroxide removal chamber 23 while the DC current is applied continuously or intermittently.

There is no particular limitation on the supply water to be passed through concentration chambers 22, 24 and the electrode chambers (i.e., anode chamber 21 and cathode chamber 25), and supply water independent for each chamber may be used, and the same supply water may be branched and used. Further, the water to be treated or the treated water discharged from hydrogen peroxide removal chamber 23 may be fed as the supply water, or the supply water of another system containing no hydrogen peroxide may be fed. In addition, although the flows of the supply water and the water to be treated in the electrode chambers, concentration chambers 22, 24 and hydrogen peroxide removal chamber 23 have mutually co-current relationship in the drawing, but water may be flowed so as to be countercurrent between adjacent chambers.

In the configuration shown in FIG. 2, a basic configuration consisting of [concentration chamber (C) 22|anion exchange membrane (AEM) 32|hydrogen peroxide removal chamber (H) 23|cation exchange membrane (CEM) 33|concentration chamber (C) 24] is disposed between anode 11 and cathode 12. This basic configuration is called a cell set. In practice, a plurality of such a cell set ("N set" in FIG. 2) may be juxtaposed between the electrodes so that a plurality of the cell sets are electrically connected in series in which one end serves as anode 11 and the other end serves as cathode 12, so as to increase the processing capacity. In this case, since the adjacent concentration chambers can be shared between adjacent cell sets, as a configuration of the hydrogen peroxide removing device according to the present invention, it is possible to have a configuration of [anode chamber |CEM|C|X|X| . . . |X|AEM| cathode chamber] when a repeating unit composed of [AEM|H|CEM|C] is represented by X. In such a series structure, with respect to hydrogen peroxide removal chamber 23 closest to anode chamber 21, anode chamber 21 itself can function as concentration chamber 22 without independently interposing concentration chamber 22 between hydrogen peroxide removal chamber 23 and anode chamber 21. Similarly, with respect to hydrogen peroxide removal chamber 23 closest to cathode chamber 25, cathode chamber 25 itself can function as concentration chamber 24 without independently interposing concentration chamber 24 between hydrogen peroxide removal chamber 23 and cathode chamber 25.

FIG. 3 shows another specific example of the hydrogen peroxide removal device, in which, in the configuration shown in FIG. 2, a cation exchange resin (CER) is filled in anode chamber 21, an anion exchange resin (AER) is filled in concentration chambers 22, 24 and cathode chamber 25, and an anion exchange resin on which the platinum group metal catalyst is supported (Cat. AER) is filled in hydrogen peroxide removal chamber 23.

FIG. 4 shows an example in which, in the hydrogen peroxide removing apparatus shown in FIG. 3, treated water after hydrogen peroxide is removed in hydrogen peroxide removal chamber 23 is used as the supply water for each of anode chamber 21, first concentration chamber 22, second concentration chamber 24 and cathode chamber 25. Portions of the treated water obtained from hydrogen peroxide removal chamber 23 are passed through first concentration chamber 22 and second concentration chamber 24, and are then discharged as concentrated water, respectively. Further, a portion of the treated water is passed through cathode chamber 25, and the discharged electrode water is further passed through anode chamber 21. By using the treated water from which hydrogen peroxide has been removed as the supply water to be supplied to concentration chambers and the electrode chambers, the possibility of oxidative deterioration of the ion exchangers contained in the concentration chambers and the electrode chambers is reduced.

In the hydrogen peroxide removing device of the first configuration example, an ion exchanger not supporting a metal catalyst can be packed in hydrogen peroxide removing chamber 23, in addition to an anion exchanger supporting the platinum group metal catalyst (Cat. AER). Such an example will be described below. When an ion exchanger not supporting a metal catalyst is packed in hydrogen peroxide removal chamber 23, it is preferable to define the layout of arranging each ion exchanger such that the ion exchanger supporting the metal catalyst is disposed in contact with the inlet of the water to be treated in hydrogen peroxide removal chamber 23 so as to prevent the ion exchanger which does not support a metal catalyst from being deteriorated by hydrogen peroxide. In the following description, the anion exchange resin supporting the platinum group metal catalyst is also referred to as a catalyst-supported anion exchange resin (Cat. AER). When simply referred to as an anion exchange resin (AER) and a cation exchange resin (CER), they refer to an anion exchange resin and a cation exchange resin that do not support a metal catalyst, respectively.

In the hydrogen peroxide removing device shown in FIG. 5, the catalyst-supported anion exchange resin (Cat. AER) and the anion exchange resin (AER) are filled in hydrogen peroxide removal chamber 23 in a mixed manner. A cation exchange resin (CER) may be filled instead of the anion exchange resin (AER). In this configuration, as compared with a case where only the catalyst-supported anion exchange resin (Cat. AER) is filled in hydrogen peroxide removal chamber 23, the amount of the expensive platinum group metal catalyst to be used can be reduced, so that the cost can be reduced.

Figures 6, 7:
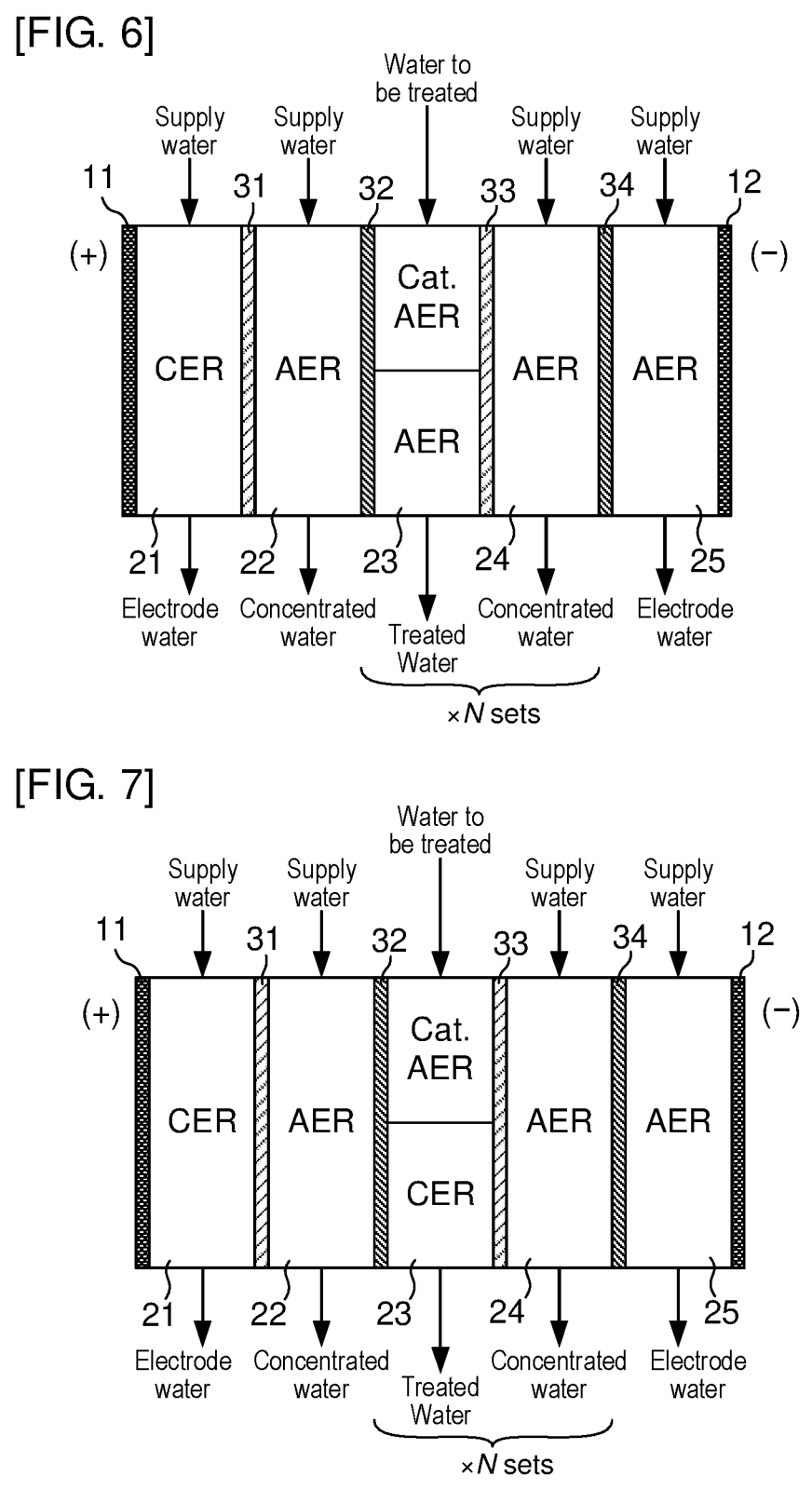

In the hydrogen peroxide removing device shown in FIG. 6, the layer of the catalyst-supported anion exchange resin (Cat. AER) and the layer of the anion exchange resin (AER) are filled in hydrogen peroxide removal chamber 23 in a multilayered bed configuration in which these layers are alternately arranged so that the layer of the catalyst-supported anion exchange resin (Cat. AER) becomes an upstream side along the flow of water. In this hydrogen peroxide removing device, decomposition and removal of hydrogen peroxide is performed in the vicinity of the inlet of the water to be processed in hydrogen peroxide removal chamber 23, and deionization treatment for anions is performed in entire hydrogen peroxide removal chamber 23.

The hydrogen peroxide removing device shown in FIG. 7 is obtained by filling hydrogen peroxide removing chamber 23 of the hydrogen peroxide removing device shown in FIG. 6 with a cation exchange resin (CER) instead of the anion exchange resin (AER). Therefore, in hydrogen peroxide removal chamber 23, the layer of the catalyst-supported anion exchange resin (Cat. AER) and the layer of the cation exchange resin (CER) are filled in a multilayered bed configuration so that the layer of the catalyst-supported anion exchange resin (Cat. AER) becomes an upstream side along the flow of water. In this hydrogen peroxide removing device, decomposition and removal of hydrogen peroxide is performed in the vicinity of the inlet of the water to be treated in hydrogen peroxide removal chamber 23, and as a whole, deionization treatment for anions and cations is performed.

In the hydrogen peroxide removal device shown in FIG. 8, a layer of the catalyst-supported anion exchange resin (Cat. AER), a layer of the cation exchange resin (CER) and a layer of the anion exchange resin (AER) are filled in a multilayered bed configuration in this order from the upstream side along the flow of water in hydrogen peroxide removal chamber 23. Also in hydrogen peroxide removal chamber 23 of this hydrogen peroxide removing device, removal of hydrogen peroxide and deionization treatment for both anions and cations are performed, and regeneration of the respective ion exchange resins is simultaneously performed.

Also in the hydrogen peroxide removing devices described using FIGS. 6 to 8, since hydrogen peroxide removal chamber 23 has a multilayered bed configuration, the amount of the expensive platinum group metal catalyst to be used can be reduced as compared with the case where only the catalyst-supported anion exchange resin (Cat. AER) is filled in hydrogen peroxide removal chamber 23, the cost can be reduced.

As described above, the anode chamber can also function as a concentration chamber without providing a concentration chamber adjacent to the anode chamber, and similarly, the cathode chamber can also function as a concentration chamber without providing a concentration chamber adjacent to the cathode chamber. In the hydrogen peroxide removal device shown in FIG. 9, anode 11, anode chamber 26, anion exchange membrane 32, hydrogen peroxide removal chamber 23, cation exchange membrane 33, cathode chamber 27 and cathode 12 are arranged in this order.

Each of anode chamber 26 and cathode chamber 27 also has a function as a concentration chamber. Anode chamber 26 is filled with an anion exchange resin (AER) or a cation exchange resin (CER), hydrogen peroxide removal chamber 23 is filled with a catalyst-supported anion exchange resin (Cat. AER), and cathode chamber 27 is filled with an anion exchange resin (AER) or a cation exchange resin (CER). This hydrogen peroxide removing device is the same as the hydrogen peroxide removing device shown in FIG. 3 except that anode chamber 26 and cathode chamber 27 has the function as concentration chambers 22, 24, respectively, and concentration chambers 22, 24 are not provided instead. Therefore, the hydrogen peroxide removal device shown in FIG. 9 operates in the same manner as the hydrogen peroxide removal device shown in FIG. 3.

Next, the hydrogen peroxide removing device of the second configuration example will be described. In the hydrogen peroxide removal device of the first configuration example, a configuration is possible in which a deionization chamber may be provided between anode 11 and cathode 12 so as to be adjacent to hydrogen peroxide removal chamber 23 via an intermediate ion exchange membrane on the cathode side or the anode side of hydrogen peroxide removal chamber 23, and the treated water obtained by passing the water to be treated through the hydrogen peroxide removal chamber may be passed through the deionization chamber. The deionization chamber is filled with an ion exchanger. In this configuration, it is possible to simultaneously perform removal of hydrogen peroxide from the water to be treated and deionization, and it becomes possible to produce pure water of high purity as well as ultrapure water. The intermediate ion exchange membrane may be an anion exchange membrane or a cation exchange membrane, and may be a composite membrane such as a bipolar membrane.

FIG. 10 shows a hydrogen peroxide removal device according to the second configuration example. The hydrogen peroxide removal device illustrated is one in which intermediate ion exchange membrane 36 is disposed in place of the second ion exchange membrane of the hydrogen peroxide removal device shown in FIG. 2. Deionization chamber 28 filled with an ion exchanger is provided on the side facing cathode 12 of intermediate ion exchange membrane 36, the second ion exchange membrane is disposed between deionization chamber 28 and cathode chamber 25, and the treated water treated in hydrogen peroxide removal chamber 23 is passed through deionization chamber 28. In the illustrated example, anode 11, anode chamber 21, cation exchange membrane 31, first concentration chamber 22, anion exchange membrane 32, hydrogen peroxide removal chamber 23, intermediate ion exchange membrane 36, deionization chamber 28, cation exchange membrane 33, second concentration chamber 24, anion exchange membrane 34, cathode chamber 25 and cathode 12 are arranged in this order.

FIG. 11 shows one specific example of the hydrogen peroxide removal device of the second configuration example. The hydrogen peroxide removal device shown in FIG. 11 is one obtained by arranging deionization chamber 28 between hydrogen peroxide removal chamber 23 and second concentration chamber 24 in the hydrogen peroxide removal device shown in FIG. 3. Hydrogen peroxide removal chamber 23 and deionization chamber 28 are partitioned by cation exchange membrane 35 which is an intermediate ion exchange membrane, and deionization chamber 28 and second concentration chamber 24 are partitioned by cation exchange membrane 33 which is the second ion exchange membrane. The water to be treated is supplied to hydrogen peroxide removal chamber 23, and, after the hydrogen peroxide is decomposed and removed in hydrogen peroxide removal chamber 23, is passed through deionization chamber 28. The treated water from which the hydrogen peroxide has been removed and which has been subjected to the deionization treatment is discharged from deionization chamber 28. Also in the hydrogen peroxide removing apparatus shown in FIG. 11, defining a configuration from anion exchange membrane 32 to second concentration chamber 24 as a repeating unit X, a plurality of repeating units X can be provided in series between first concentration chamber 22 adjacent to anode chamber 21 and anion exchange membrane 34 adjacent to cathode chamber 25.

The hydrogen peroxide removal device shown in FIG. 12 differs from the hydrogen peroxide removal device shown in FIG. 11 in that demineralization chamber 28 is filled with the anion exchange resin and the cation exchange resin in a mixed bed (MB) configuration. In FIG. 12, the intermediate ion exchange membrane partitioning hydrogen peroxide removal chamber 23 and demineralization chamber 28 is composed of anion exchange membrane 37.

The hydrogen peroxide removal device shown in FIG. 13 is different from the hydrogen peroxide removal device shown in FIG. 11 in that anion exchange membrane 37 is used as the intermediate ion exchange membrane partitioning hydrogen peroxide removal chamber 23 and deionization chamber 28, and, in deionization chamber 28, the layer of the cation exchange resin (CER) and the layer of the anion exchange resin (AER) are alternately arranged along the flow direction of water in this order so that they are filled in a multilayered bed configuration. Deionization chamber 28 and concentration chamber 24 on the side facing cathode 12 are partitioned by cation exchange membrane 33.

The hydrogen peroxide removal device shown in FIG. 14 is a device in which, in the hydrogen peroxide removing apparatus shown in FIG. 13, hydrogen peroxide removal chamber 29 serving as an auxiliary is arranged between concentration chamber 24 on the side facing cathode 12 and cathode chamber 25. Hydrogen peroxide removal chamber 29 is also filled with an anion exchanger on which the platinum group metal catalyst is supported (Cat. AER) and suppled with the water to be treated. Water discharged from hydrogen peroxide removal chamber 29 is supplied to deionization chamber 28 by merging with water discharged from hydrogen peroxide removal chamber 23. Concentration chamber 24 and hydrogen peroxide removal chamber 29 are adjacent to each other with anion exchange membrane 34 interposed therebetween, and hydrogen peroxide removal chamber 29 and cathode chamber 25 are adjacent to each other with anion exchange membrane 38 interposed therebetween. Since the hydrogen peroxide removing apparatus shown in FIG. 14 has a plurality of hydrogen peroxide removal chambers 23, 29, removal of hydrogen peroxide can be performed more efficiently.

In the hydrogen peroxide removal device, cathode chamber 25 can also be filled with an anion exchanger carrying a platinum group metal catalyst (Cat. AER), and cathode chamber 25 itself can function as a hydrogen peroxide removing chamber. The hydrogen peroxide removal device shown in FIG. 15 is a device in which, in the hydrogen peroxide removal device shown in FIG. 3, cathode chamber 25 is also configured to be filled with the catalyst-supported anion exchange resin (Cat. AER) and supplied with the water to be treated. The water discharged from cathode chamber 25, that is, the cathode water, merges with the water discharged from hydrogen peroxide removal chamber 23 and is discharged as the treated water. This configuration is useful when the water to be treated contains carbonic acid components but does not contain cations. In the configuration shown in FIG. 15, it is possible to omit concentration chambers 22, 24, hydrogen peroxide removal chamber 23, cation exchange membranes 31, 33, and anion exchange membrane 32 so that anode chamber provided with anode 11 and filled with a cation exchange resin (CER) adjoins cathode chamber 25 with anion exchange membrane 34 interposed therebetween.

EXAMPLES

Next, the present invention will be described in more detail with reference to Examples and Comparative Examples.

Example 1

A water treatment apparatus as shown in FIG. 1A was assembled. As ultraviolet oxidation device 103, an ultraviolet oxidation device (FOV type) manufactured by Funatech Co., Ltd. was used. As hydrogen peroxide removal device 105, one having the configuration shown in FIG. 13 with five sets of repeating units X was used (i.e., N=5). The size of each of chambers (anode chamber 21, concentration chambers 22, 24, hydrogen peroxide removal chamber 23 and cathode chamber 25) in hydrogen peroxide removal device 105 was 160 mm×280 mm×8 mm. The operating current in hydrogen peroxide removal device 105 was set to 3.0 A. As the water to be treated, ultrapure water to which isopropyl alcohol was added as a TOC component was used. The flow rate of the water to be treated supplied to ultraviolet oxidation device 103 was set to 570 L/h, and 500 L/h of the outlet water discharged at a flow rate of 570 L/h from ultraviolet oxidation device 103 was used as the water to be treated of the hydrogen peroxide removal device 105. At this time, the irradiation amount of the ultraviolet lamp in ultraviolet oxidation device 103 was 1000 W·h/m³. The water quality (specific resistance), hydrogen peroxide concentration, TOC concentration and dissolved oxygen concentration were measured at the inlet of ultraviolet oxidation device 103, the inlet of hydrogen peroxide removal device 105 and the outlet of hydrogen peroxide removal device 105 while changing the amount of hydrogen peroxide added. Also, the TOC removal rate was calculated from the TOC concentrations at the inlet of ultraviolet oxidation device 103 and the outlet of hydrogen peroxide removal device 105. The results are shown in Table 1. The water temperature is the temperature of the water to be treated supplied to ultraviolet oxidation device 103. FIG. 16 shows the relationship between the hydrogen peroxide concentration at the inlet of ultraviolet oxidation device 103 and the TOC removal rate.

TABLE 1

| | | Condition 1 | Condition 2 | Condition 3 | Condition 4 | Condition 5 | Condition 6 |
|---|---|---|---|---|---|---|---|
| Water quality [MΩ/cm] | Outlet of ultraviolet oxidation device | 2.94 | 2.04 | 1.54 | 1.54 | 1.45 | 1.59 |
| | Outlet of hydrogen peroxide removal device | 18.2 | 18.2 | 18.2 | 18.2 | 18.2 | 18.2 |

TABLE 1-continued

| | | Condition 1 | Condition 2 | Condition 3 | Condition 4 | Condition 5 | Condition 6 |
|---|---|---|---|---|---|---|---|
| Water temperature [° C.] | | | | 23.3 | | | |
| Hydrogen peroxide concentration [µg/L] | Inlet of ultraviolet oxidation device | 6 | 120 | 450 | 500 | 700 | 1070 |
| | Outlet of ultraviolet oxidation device | 1 | — | 29 | 100 | 240 | 450 |
| | Outlet of hydrogen peroxide removal device | <2 | <2 | <2 | <2 | <2 | <2 |
| TOC concentration [µg/L] | Inlet of ultraviolet oxidation device | | | 60.2 | | | |
| | Outlet of hydrogen peroxide removal device | 19.5 | 12.1 | 6.9 | 4.6 | 5.8 | 8.8 |
| Removal rate of TOC [%] | | 68 | 80 | 89 | 92 | 90 | 85 |
| Dissolved oxygen concentration [mg/L] | Inlet of ultraviolet oxidation device | | | <0.01 | | | |
| | Outlet of hydrogen peroxide removal device | <0.01 | — | 0.01 | 0.05 | 0.12 | 0.31 |

From Table 1 and FIG. 16, it can be seen that the TOC removal performance represented by the TOC removal rate is highest when the concentration of hydrogen peroxide at the inlet of ultraviolet oxidation device 103 is about 500 µg/L. It cannot be said that increasing the concentration of hydrogen peroxide improves the TOC removal performance. When the hydrogen peroxide concentration exceeded 500 µg/L, the TOC removal performance rather decreased. In order to maintain the TOC removal rate at 80% or more, it was also found that the amount of hydrogen peroxide added at the inlet of ultraviolet oxidation device 103 should be adjusted in the region where the hydrogen peroxide concentration at the outlet of ultraviolet oxidation device 103 is 500 µg/L or less, and the dissolved oxygen concentration at the outlet of hydrogen peroxide removal device 105 is 0.3 mg/L or less. It was also found that the specific resistance at the outlet of hydrogen peroxide remover 105 is close to the theoretical value of pure water, and that hydrogen peroxide removal device 105 can effectively remove carbonic acid and organic acids generated by the ultraviolet oxidation treatment. This means that the water treatment apparatus according to the present invention does not need to be provided, in the subsequent stage, with an ion exchange apparatus for removing the carbonic acid components and organic acids which have been generated by the ultraviolet oxidation treatment.

Comparative Example 1

The same experiment as in Example 1 was conducted using the same apparatus as in Example 1 for the case where the dissolved oxygen concentration in the water to be treated supplied to ultraviolet oxidation device 103 was high. However, the flow rate of the water to be treated to ultraviolet oxidation device 103 was set to 1390 L/h, and 750 L/h of the outlet water of ultraviolet oxidation device 103 was used as the water to be treated for hydrogen peroxide removal device 105 and supplied to hydrogen peroxide removal device 105. The ultraviolet lamp irradiation amount in ultraviolet oxidation device 103 was 410 W·h/m³. The results are shown in Table 2 and FIG. 17.

TABLE 2

| | | Condition 1 | Condition 2 | Condition 3 | Condition 4 | Condition 5 | Condition 6 |
|---|---|---|---|---|---|---|---|
| Water quality [MΩ/cm] | Outlet of ultraviolet oxidation device | 0.37 | 0.34 | 0.34 | 0.34 | 0.34 | 0.34 |
| | Outlet of hydrogen peroxide removal device | 17.0 | 16.9 | 17.0 | 17.0 | 17.1 | 17.1 |
| Water temperature [° C.] | | | | 23.5 | | | |
| Hydrogen peroxide concentration [µg/L] | Inlet of ultraviolet oxidation device | 6 | 120 | 250 | 600 | 710 | 1890 |
| | Outlet of ultraviolet oxidation device | 52 | 130 | 250 | 480 | 690 | 1460 |
| | Outlet of hydrogen peroxide removal device | <2 | <2 | <2 | <2 | 2.4 | 4.2 |
| TOC concentration [µg/L] | Inlet of ultraviolet oxidation device | | | 24.5 | | | |
| | Outlet of hydrogen peroxide removal device | 9.8 | 9.9 | 10.3 | 10.7 | 10.7 | 10.9 |

TABLE 2-continued

|  |  | Condition 1 | Condition 2 | Condition 3 | Con-dition 4 | Con-dition 5 | Con-dition 6 |
|---|---|---|---|---|---|---|---|
| Removal rate of TOC [%] |  | 60 | 59 | 57 | 56 | 56 | 55 |
| Dissolved oxygen concentration [mg/L] | Inlet of ultraviolet oxidation device |  |  | 3.74 |  |  |  |
|  | Outlet of hydrogen peroxide removal device | 3.80 | — | 3.91 | — | 4.16 | 4.68 |

From the results of Comparative Example 1, it was confirmed that when the dissolved oxygen concentration at the inlet of ultraviolet oxidation device 103 exceeds 3 mg/L, the addition of hydrogen peroxide does not improve the TOC removal efficiency.

Example 2, and Comparative Examples 2 and 3

The outlet water from the ultraviolet oxidation treatment contains carbonic acid components and organic acids produced by the oxidation treatment of organic components, and hydrogen peroxide produced by the oxidation treatment of water, and the like. In order to remove these components, conventionally, a non-regenerative ion exchange device (cartridge polisher (CP)), an ion exchange resin column supporting palladium (Pd-supported ion exchange resin column), or the like has been used. Carbonic acid components and organic acids are mainly removed in the cartridge polisher, and hydrogen peroxide is mainly removed in the Pd-supported ion exchange resin column. Therefore, the hydrogen peroxide removal performance of these devices was compared with the hydrogen peroxide removal performance of the hydrogen peroxide removal device used in the water treatment apparatus according to the present invention.

As test water, water which was permeated reverse osmosis membrane (RO) devices connected in series in two stages and added with hydrogen peroxide and carbonic acid was prepared. The hydrogen peroxide concentration in the test water was 40 to 50 ng/L, and the carbonic acid concentration was 2.8 to 3.2 mg/L (as $CO_2$). As Example 2, test water was passed through the same apparatus as in Example 1 at a treatment flow rate of 750 L/h, and changes in hydrogen peroxide concentration in the treated water discharged as outlet water were investigated. The operating current of the hydrogen peroxide removal device was set to 3.0 A. As Comparative Example 2, a cartridge polisher with a resin amount of 5 L in which an anion exchange resin and a cation exchange resin were mixed at a ratio (volume ratio) of 2:1 was prepared, the same test water as Example 2 was flowed at a flow rate of 500 L/h, and the change in hydrogen peroxide concentration in the treated water discharged as outlet water was investigated. As Comparative Example 3, a Pd-supported ion exchange resin column with a resin amount of 0.5 L was prepared, the same test water as in Example 2 was flowed at 50 L/h, and the hydrogen peroxide concentration in the treated water discharged as outlet water was investigated. The results of Example 2, and Comparative Examples 2 and 3 are shown in FIG. 18.

As can be seen from FIG. 18, the cartridge polisher of Comparative Example 2 could hardly remove hydrogen peroxide, and hydrogen peroxide passed through. In the Pd-supported ion-exchange resin column of Comparative Example 3, hydrogen peroxide could be removed immediately after the start of operation, but the leak amount of hydrogen peroxide increased with the passage of the operating time. This is considered to be due to the adsorption of carbonate ions and bicarbonate ions on the ion exchange resin on which Pd is supported, that is, on the catalyst-supported anion exchange resin (Cat. AER). On the other hand, in Example 2, that is, the hydrogen peroxide removal device used in the water treatment device according to the present invention, it was found that hydrogen peroxide can be stably removed over a long period of time from the start of operation, and the amount of leakage of hydrogen peroxide is small. This is considered that because the ion-exchange resin supporting Pd, that is, the catalyst-supported anion-exchange resin (Cat. AER) is maintained in its regenerated state by the hydroxide ions produced by the dissociation reaction of water that proceeds upon application of an electric current.

REFERENCE SIGNS LIST

11 Anode;
12 Cathode;
21, 26 Anode chamber;
22, 24 Concentration chamber;
23, 29 Hydrogen peroxide removal chamber;
25, 27 Cathode chamber;
28 Deionization chamber;
31, 33, 35 Cation exchange membrane (CEM);
32, 34, 37, 38 Anion exchange membrane (AEM);
36 Intermediate ion exchange membrane;
101 Hydrogen peroxide source;
102 Hydrogen peroxide injection amount adjusting means;
103 Ultraviolet oxidation apparatus;
104 Membrane degassing apparatus;
105 Hydrogen peroxide removal device;
106 Hydrogen peroxide meter; and
107 Dissolved oxygen meter.

The invention claimed is:
1. A water treatment method for decomposing organic substances contained in water to be treated, comprising:
  adding hydrogen peroxide to the water to be treated;
  irradiating the water to be treated to which hydrogen peroxide has been added with ultraviolet light; and
  removing hydrogen peroxide contained in outlet water from the ultraviolet irradiation,
  wherein the hydrogen peroxide removal includes: applying a DC current between an anode and a cathode; and passing the water to be treated into a hydrogen peroxide removal chamber arranged between the anode and the cathode and packed with a metal catalyst having an ability of decomposing hydrogen peroxide, and
  wherein the hydrogen peroxide removal chamber is partitioned by an anion exchange membrane arranged on a side facing the anode.

2. The water treatment method according to claim 1, wherein the metal catalyst is a platinum group metal catalyst, and an ion exchanger, carrying the platinum group metal catalyst, is packed in the hydrogen peroxide removing chamber.

3. The water treatment method according to claim 2, further comprising removing oxygen from the water to be treated such that dissolved oxygen concentration in an inlet water from the ultraviolet irradiation is 3 mg/L or less.

4. The water treatment method according to claim 2, wherein an amount of hydrogen peroxide to be added to the water to be treated is adjusted in accordance with at least one of dissolved oxygen concentration in outlet water from the hydrogen peroxide removal, hydrogen peroxide concentration in outlet water from the ultraviolet irradiation, and hydrogen peroxide concentration in inlet water from the hydrogen peroxide removal.

5. The water treatment method according to claim 2, wherein an amount of hydrogen peroxide to be added to the water to be treated is adjusted so that dissolved oxygen concentration in outlet water from the hydrogen peroxide removal is 0.3 mg/L or less.

6. The water treatment method according to claim 2, wherein an amount of hydrogen peroxide to be added to the water to be treated is adjusted so that hydrogen peroxide concentration in at least one of outlet water from the ultraviolet irradiation and inlet water from the hydrogen peroxide removal is 500 μg/L or less.

7. The water treatment method according to claim 1, further comprising removing oxygen from the water to be treated such that dissolved oxygen concentration in an inlet water from the ultraviolet irradiation is 3 mg/L or less.

8. The water treatment method according to claim 1, wherein an amount of hydrogen peroxide to be added to the water to be treated is adjusted in accordance with at least one of dissolved oxygen concentration in outlet water from the hydrogen peroxide removal, hydrogen peroxide concentration in outlet water from the ultraviolet irradiation, and hydrogen peroxide concentration in inlet water from the hydrogen peroxide removal.

9. The water treatment method according to claim 1, wherein an amount of hydrogen peroxide to be added to the water to be treated is adjusted so that dissolved oxygen concentration in outlet water from the hydrogen peroxide removal is 0.3 mg/L or less.

10. The water treatment method according to claim 1, wherein an amount of hydrogen peroxide to be added to the water to be treated is adjusted so that hydrogen peroxide concentration in at least one of outlet water from the ultraviolet irradiation and inlet water from the hydrogen peroxide removal is 500 μg/L or less.

11. A water treatment apparatus that decomposes organic substances contained in water to be treated, comprising:

a hydrogen peroxide source configured to add hydrogen peroxide to a pipe that includes the water to be treated;

an ultraviolet oxidation device configured to irradiate the water to be treated to which hydrogen peroxide has been added with ultraviolet light; and a hydrogen peroxide removal device configured to remove hydrogen peroxide contained in outlet water from the ultraviolet oxidation device, wherein the hydrogen peroxide removal device comprises:

an anode and a cathode; and a hydrogen peroxide removal chamber disposed between the anode and the cathode and packed with a metal catalyst having an ability of decomposing hydrogen peroxide, the hydrogen peroxide removal chamber being partitioned by an anion exchange membrane arranged on a side facing the anode, and wherein the removal device is configured so that a DC current can be applied between the anode and the cathode.

12. The water treatment apparatus according to claim 11, wherein the metal catalyst is a platinum group metal catalyst, and an ion exchanger carrying the platinum group metal catalyst is filled in the hydrogen peroxide removing chamber.

13. The water treatment apparatus according to claim 12, comprising a membrane degassing device configured to remove oxygen from the water to be treated which is arranged upstream of the ultraviolet oxidation device.

14. The water treatment apparatus according to claim 11, comprising a membrane degassing device configured to remove oxygen from the water to be treated which is arranged upstream of the ultraviolet oxidation device.

15. The water treatment apparatus according to claim 11, comprising a pump configured to adjust an amount of hydrogen peroxide to be added to the water to be treated in accordance with at least one of dissolved oxygen concentration in outlet water of the hydrogen peroxide removal device, hydrogen peroxide concentration in outlet water of the ultraviolet oxidation device, and hydrogen peroxide concentration in inlet water of the hydrogen peroxide removal device.

* * * * *